US009001803B2

(12) United States Patent
Bollea et al.

(10) Patent No.: US 9,001,803 B2
(45) Date of Patent: Apr. 7, 2015

(54) METHOD AND SYSTEM FOR SWITCHED BEAM ANTENNA COMMUNICATIONS

(75) Inventors: Loris Bollea, Turin (IT); Valeria D'Amico, Turin (IT); Maurizio Fodrini, Turin (IT); Paolo Gallo, Turin (IT); Bruno Melis, Turin (IT); Alfredo Ruscitto, Turin (IT)

(73) Assignees: Telecom Italia S.p.A., Milan (IT); Advanced Digital Broadcast S.A., Pregny-Chambesy (CH)

( * ) Notice: Subject to any disclaimer, the term of this patent is extended or adjusted under 35 U.S.C. 154(b) by 799 days.

(21) Appl. No.: 12/809,530

(22) PCT Filed: Dec. 19, 2007

(86) PCT No.: PCT/EP2007/011140
§ 371 (c)(1),
(2), (4) Date: Oct. 21, 2010

(87) PCT Pub. No.: WO2009/080057
PCT Pub. Date: Jul. 2, 2009

(65) Prior Publication Data

US 2011/0026418 A1 Feb. 3, 2011

(51) Int. Cl.
*H04W 4/00* (2009.01)
*H01Q 3/26* (2006.01)
(Continued)

(52) U.S. Cl.
CPC ........... *H01Q 3/2605* (2013.01); *H01Q 1/2258* (2013.01)

(58) Field of Classification Search
USPC .......................... 455/562.1, 575, 13; 370/252
See application file for complete search history.

(56) References Cited

U.S. PATENT DOCUMENTS 5,504,465 A 4/1996 Yung et al.
5,930,293 A 7/1999 Light et al.
(Continued)

FOREIGN PATENT DOCUMENTS

EP 1 164 718 A2 12/2001
EP 1 267 501 A2 12/2002
(Continued)

OTHER PUBLICATIONS

Fahmy et al.; "Ad Hoc Networks with Smart Antennas Using IEEE 802.11-Based Protocols", ICC 2002, 2002 IEEE International Conference on Communications, Conference Proceedings, pp. 3144-3148, (2002).

(Continued)

*Primary Examiner* — Eunsook Choi
(74) *Attorney, Agent, or Firm* — Finnegan, Henderson, Farabow, Garrett Dunner, L.L.P.

(57) ABSTRACT

A system for processing an RF signal received via a plurality of antenna elements includes a connection arrangement for selecting a sub-set of a given number of RF signals received from the antenna elements as well as a processing arrangement for combining the received RF signals of the selected sub-set into a single RF signal for demodulation. The system includes an RF phasing circuit for producing selective combinations of the received RF signals by applying relative RF phase shift weights to the RF signals that are combined; each combination includes RF signals received from a number of adjacent antenna elements equal to the number of the RF signals in the sub-set to be selected. A radio performance estimator generates for each selective combination of RF signals at least one non-RF radio performance indicator representative of the quality of the RF signals in the combination. A decision block identifies the sub-set of received RF signals to be selected as a function of the one radio performance indicator generated for the selective combinations of the received RF signals.

16 Claims, 11 Drawing Sheets

(51) Int. Cl.

| | |
|---|---|
| ***H01Q 1/22*** | (2006.01) |
| *H04B 7/216* | (2006.01) |

(56) References Cited

U.S. PATENT DOCUMENTS

| | | | | |
|---|---|---|---|---|
| 5,982,825 | A | 11/1999 | Tsujimoto | |
| 6,154,652 | A | 11/2000 | Park et al. | |
| 6,259,730 | B1 | 7/2001 | Solondz | |
| 6,438,389 | B1 * | 8/2002 | Sandhu et al. | 455/562.1 |
| 6,658,269 | B1 | 12/2003 | Golemon et al. | |
| 6,907,272 | B2 * | 6/2005 | Roy | 455/562.1 |
| 6,917,597 | B1 | 7/2005 | Schmidl et al. | |
| 6,992,621 | B2 * | 1/2006 | Casas et al. | 342/373 |
| 7,062,294 | B1 * | 6/2006 | Rogard et al. | 455/562.1 |
| 7,155,192 | B2 | 12/2006 | Ghassemzadeh et al. | |
| 7,403,748 | B1 * | 7/2008 | Keskitalo et al. | 455/101 |
| 7,433,713 | B2 | 10/2008 | Haskell et al. | |
| 7,450,907 | B2 | 11/2008 | Shurvinton et al. | |
| 7,653,149 | B2 | 1/2010 | Strich et al. | |
| 7,697,626 | B2 * | 4/2010 | Wang et al. | 375/267 |
| 8,185,161 | B2 | 5/2012 | Haskell et al. | |
| 2001/0016504 | A1 | 8/2001 | Dam et al. | |
| 2002/0187813 | A1 * | 12/2002 | Guo | 455/562 |
| 2002/0190790 | A1 | 12/2002 | Cheng et al. | |
| 2004/0087294 | A1 | 5/2004 | Wang | |
| 2004/0224655 | A1 | 11/2004 | Petrov et al. | |
| 2004/0234012 | A1 * | 11/2004 | Rooyen | 375/347 |
| 2004/0266338 | A1 | 12/2004 | Rowitch | |
| 2005/0025271 | A1 * | 2/2005 | Molisch et al. | 375/347 |
| 2005/0143037 | A1 * | 6/2005 | Stratis et al. | 455/277.1 |
| 2005/0163270 | A1 | 7/2005 | Akita et al. | |
| 2005/0181831 | A1 * | 8/2005 | Doi | 455/562.1 |
| 2005/0227619 | A1 * | 10/2005 | Lee et al. | 455/22 |
| 2005/0287692 | A1 | 12/2005 | Kim et al. | |
| 2006/0079221 | A1 | 4/2006 | Grant et al. | |
| 2007/0080886 | A1 * | 4/2007 | Thomas et al. | 343/824 |
| 2007/0093269 | A1 * | 4/2007 | Leabman | 455/562.1 |
| 2007/0205943 | A1 * | 9/2007 | Nassiri-Toussi et al. | 342/377 |
| 2010/0322336 | A1 | 12/2010 | Nabar et al. | |
| 2011/0097992 | A1 | 4/2011 | Goransson et al. | |
| 2011/0261805 | A1 | 10/2011 | Landry et al. | |
| 2011/0274194 | A1 | 11/2011 | Feher | |
| 2011/0312269 | A1 | 12/2011 | Judd et al. | |
| 2012/0039410 | A1 | 2/2012 | Feher | |
| 2012/0069131 | A1 | 3/2012 | Abelow | |
| 2012/0099668 | A1 | 4/2012 | Sakata et al. | |

FOREIGN PATENT DOCUMENTS

| | | | |
|---|---|---|---|
| EP | 1267501 | A2 * | 12/2002 |
| EP | 1475904 | A2 | 11/2004 |
| EP | 1 489 758 | A1 | 12/2004 |
| EP | 1487134 | A1 | 12/2004 |
| EP | 1489758 | A1 * | 12/2004 |
| WO | WO 02/03568 | A1 | 1/2002 |
| WO | WO 0203568 | A1 * | 1/2002 |
| WO | WO 03/055097 | A3 | 7/2003 |
| WO | WO 2006/023247 | A1 | 3/2006 |
| WO | WO-2006/023247 | A1 | 3/2006 |
| WO | WO 2006/037364 | A1 | 4/2006 |
| WO | WO 2007/019185 | A2 | 2/2007 |
| WO | WO 2007/038969 | A1 | 4/2007 |
| WO | WO 2008/064696 | A1 | 6/2008 |

OTHER PUBLICATIONS

European International Search Report for International Application No. PCT/EP2007/011140, mailing date Oct. 28, 2008.

"(O)RLANS in the Frequency Band 2400-2483.5 MHz", Electronic Communications Committee (ECC) within the European Conference of Postal and Telecommunications Administrations (CEPT), ECC Report 57, pp. 1-17, (2004).

A. Wittneben, "A New Bandwidth Efficient Transmit Antenna Modulation Diversity Scheme for Linear Digital Modulation," ICC Conference, pp. 1630-1634, Geneva (May 1993).

S. Kim et al., "Time-Delay Phase Shifter Controlled by Piezoelectric Transducer on Coplanar Waveguide," IEEE Microwave and Wireless Components Letters, vol. 13, No. 1, pp. 19-20 (Jan. 2003).

J. Lee et al., CDMA Systems Engineering Handbook, pp. 256-262 (1998).

* cited by examiner

METHOD AND SYSTEM FOR SWITCHED BEAM ANTENNA COMMUNICATIONS

CROSS REFERENCE TO RELATED APPLICATION

This application is a national phase application based on PCT/EP2007/011140, filed Dec. 19, 2007, the content of which is incorporated herein by reference.

FIELD OF THE INVENTION

The present invention relates in general to wireless communication systems, in particular to a method and apparatus for recombining received/transmitted signals in a switched beam antenna. The present invention also relates to a Wireless Local Area Network (WLAN) device provided with a switched beam antenna with radio frequency (RF) combining of received/transmitted signals.

DESCRIPTION OF THE RELATED ART

A Wireless Local Area Network (WLAN) uses radio frequency (RF) signals to transmit and receive data over the air. WLAN systems transmit on unlicensed spectrum as agreed upon by the major regulatory agencies of countries around the world, such as ETSI (European Telecommunications Standard Institute) for Europe and FCC (Federal Communications Commission) for United States.

Wireless LANs allow the user to share data and Internet access without the inconvenience and cost of pulling cables through walls or under floors. The benefits of WLANs are not limited to computer networking. As the bandwidth of WLANs increases, audio/video services might be the next target, replacing device-to-device cabling as well as providing distribution throughout home, offices and factories.

Fundamentally, a WLAN configuration consists of two essential network elements: an Access Point (AP) and a client or mobile station (STA). Access points act as network hubs and routers. Typically, at the back end, an access point connects to a wider LAN or even to the Internet itself. At the front-end the access point acts as a contact point for a flexible number of clients. A station (STA) moving into the effective broadcast radius of an access point (AP) can then connect to the local network served by the AP as well as to the wider network connected to the AP back-end.

In WLAN deployment, coverage and offered throughput are impacted by several interacting factors that are considered to meet the corresponding requirements. Wireless signals suffer attenuations as they propagate through space, especially inside buildings where walls, furniture and other obstacles cause absorption, reflections and refractions. In general the farther is the STA from the AP, the weaker is the signal it receives and the lower the physical data rates that it can reliably achieve. The radio link throughput is a function of a number of factors including the used transmission format and the packet error rate (PER) measured at the receiver. A high PER may defeat the speed advantage of a transmission format with higher nominal throughput by causing too many retransmissions. However, WLAN devices constantly monitor the quality of the signals received from devices with which they communicate. When their turn to transmit comes, they use this information to select the transmission format that is expected to provide the highest throughput. In any case, on the average, the actual data rate falls off in direct relation to the distance of the STA from the AP.

Nowadays, high performance WLAN systems are required to provide high data rate services over more and more extended coverage areas. Furthermore, they have to operate reliably in different types of environments (home, office). In other words, future high performance WLAN systems are expected to have better quality and coverage, be more power and bandwidth efficient, and to be deployed in different environments.

Most current local area network equipment operates in the 2.4 GHz industrial, scientific and medical (ISM) band. This band has the advantage of being available worldwide on a license-exempt basis, but it is expected to congest rapidly. Thus, the spectrum regulatory body of each country restricts signal power levels of various frequencies to accommodate needs of users and avoid RF interference. Most countries deem wireless LANs as license free. In order to qualify for license free operation, however, the radio devices limit power levels to relatively low values. In Europe, the Electronic Communications Committee (ECC) has defined a limiting condition in the ECC Report 57: "(O)RLANS in the Frequency Band 2400-2483.5 MHz", specifying the current regulations concerning the maximum allowed Equivalent Isotropic Radiated Power (EIRP). The limiting condition has been fixed so that the output power of the equipment results in a maximum radiated power of 100 mW (20 dBm) EIRP or less. It follows that, depending on the type of antenna used, the output power of the equipment may be reduced to produce a maximum radiated power of 100 mW EIRP or less. Combinations of power levels and antennas resulting in a radiated power level above 100 mW are considered as not compliant with national radio interface regulation.

The EIRP represents the combined effect of the power supplied to the antenna and the antenna gain, minus any loss due to cabling and connections:

$$\mathrm{EIRP(dBm)}=P_{TX}(\mathrm{dBm})+G_{TX}(\mathrm{dB})-L_{TX}(\mathrm{dB})$$

where $P_{TX}$ is the power supplied to the transmitting antenna, $G_{TX}$ is the antenna gain defined with respect to an isotropic radiator and $L_{TX}$ is the cabling loss.

Since the EIRP includes the antenna gain, this introduces a limitation to the kind of antennas that can be used at the transmitter. In order to employ an antenna with higher gain, the transmitted power is reduced, so that the EIRP remains below 20 dBm.

Solutions to the coverage range enhancement problem, which are already known in literature, use system configurations that exploit multiple omni-directional antennas in which the different signals are demodulated separately by means of distinct radio frequency (RF) processing chains and subsequently recombined digitally at baseband (BB) level, as illustrated e.g. in U.S. Pat. Nos. 6,907,272 and in 6,438,389.

More advanced antenna architectures are based on the combination of multiple directional antennas. Among these systems, Switched Beam (SB) antenna architectures are based on multiple directional antennas having fixed beams with heightened sensitivity in particular directions. These antenna systems detect the value of a particular quality of service (QoS) indicator, such as for example the signal strength or the signal quality, received from the different beams and choose the particular beam providing the best value of QoS. The procedure for the beam selection is periodically repeated in order to track the variations of the propagation channel so that a WLAN RF transceiver is continuously switched from one beam to another.

Antenna apparatus with selectable antenna elements is illustrated in WO 2006/023247, which discloses a planar antenna apparatus including a plurality of individually selectable planar antenna elements, each of which has a directional radiation pattern with gain and with polarization substantially in the plane of the planar antenna apparatus. Each antenna element may be electrically selected (e.g., switched on or off) so that the planar antenna apparatus may form a configurable radiation pattern. If all elements are switched on, the planar apparatus forms an omnidirectional radiation pattern.

A combined radiation pattern resulting from two or more antenna elements being coupled to the communication device may be more or less directional than the radiation pattern of a single antenna element.

The system may select a particular configuration of selected antenna elements that minimizes interference of the wireless link or that maximizes the gain between the system and the remote device.

U.S. Pat. No. 6,992,621 relates to wireless communication systems using passive beamformers. In particular, it describes a method to improve the performance by depopulating one or more ports of a passive beamformer and/or by increasing the order of a passive beamformer such as a Butler matrix. The Butler matrix is a passive device that forms, in conjunction with an antenna array, communication beams using signal combiners, signal splitters and signal phase shifters. A Butler matrix includes a first side with multiple antenna ports and a second side with multiple transmit or receive signal processor ports (TRX). The number of antennas and TRX ports indicates the order of the Butler matrix. The system provides a signal selection method for switching the processing among the TRX ports of the matrix. The method includes signal quality evaluation in order to determine at least one signal accessible at one or more TRX ports.

PCT patent application PCT/EP 2006/011430, not yet published at the time this application is filed, discloses a switched beam antenna that employs a Weighted Radio Frequency (WRF) combining technique. The basic idea behind the WRF solution is to select the two beams providing the highest signal quality and to combine the corresponding signals at radiofrequency by means of suitable weights. The combination of the signals received from two beams improves the value of a given indicator of the signal quality, as for example the signal to interference plus noise ratio (SINR) at the receiver, and thus the coverage range and the achievable throughput with respect to a conventional switched beam antenna.

OBJECT AND SUMMARY OF THE INVENTION

The Applicant has observed that a solution as disclosed in the last document cited above solves a number of problems inherent in those solutions exploiting multiple RF processing chains for demodulating signals received by multiple antenna elements.

As indicated, when the procedure for the beam selection is periodically repeated, a WLAN RF transceiver equipped with a SB antenna will be continuously switched from one beam to another. Instead of shaping the radiation pattern of an array of omnidirectional antennas with suitable combining weights introduced at base band (BB) level, SB antenna systems may select the outputs of the multiple directional antennas in such a way as to form finely sectorized (directional) beams with higher spatial selectivity than that achieved with an array of omnidirectional antenna elements with BB combining techniques.

The large overall gain values obtained, on the receiving side, with SB antenna systems may, though, become critical when the same antenna configuration is used in a WLAN client or access point on the transmitting side, due to the aforementioned EIRP limitations. Such systems are typically aimed to increase the range, neglecting eventual limitations due to regional power limitation regulations. Thus a possible reduction of the transmitted power is eventually introduced, leading to a loss of part of the overall performance enhancement.

One possible solution consists in employing the SB antenna system described in the last document cited in the foregoing, which is able to enhance the overall coverage range, fulfilling the regional regulations concerning limitations on the power emissions, with a smaller reduction of the transmitted power compared to the case of a conventional SB antenna. In particular, the SB antenna architecture described in the last document cited in the foregoing can be exploited by a WLAN client both in the downlink direction (i.e. the Access Point is transmitting and the WLAN client is receiving) and in the more challenging—due to the EIRP limitations—uplink direction (i.e. the WLAN client is transmitting and the Access Point is receiving).

While those solutions based on antenna systems with either selectable directional elements, mechanically or electronically controlled phased arrays and fixed beamforming (based, for example, on the exploitation of a Butler matrix) are thus able to shape a configurable radiation pattern in a certain direction, the solution described in the last document cited in the foregoing is based on a multiple directional antenna system realized with a certain number of directional antennas which are deployed in such a way that all the possible Directions of Arrival (DOAs) of the received signal are covered.

In particular, in contrast with other architectures, the architecture described in the last document cited in the foregoing is based on the exploitation of a suitable recombination and weighting technique, applied at RF, of the selected signals which are co-phased individually and summed together at RF level.

The applicant has observed that a problem related with prior art solutions is the measure of the received signal quality on beams different from that selected for the reception of the user data (which can be briefly referred to as "alternative beams") and the simultaneous reception of the user data from the selected beam. As the periodical measure of the signal quality on the alternative beams requires a significant time, it can cause the loss of several data packets that had to be received from the selected beam.

While these problems can be solved in a fully satisfactory manner by means of the SB antenna architecture with weighted radiofrequency combining (WRF) described in the last document cited in the foregoing, the need is still felt for an improved arrangement for the measure of the signal quality and beam selection applicable in a radio modem that uses the WRF technique.

Additionally, in a conventional switched beam antenna a single RF receiver is used to demodulate the signal received by the beam with the best value of a given indicator of the signal quality, as for example the signal to interference plus noise ratio (SINR).

The Applicant has observed that one problem related with such architecture is the measure of the received signal quality on the different beams and the simultaneous reception of the user data. As the periodical measure of the signal quality on the different beams requires a significant time, it can cause the loss of several data packets. The packet loss turns into a degradation of the QoS perceived by the user and, in case of real time services, in a temporary service interruption.

The object of the invention is thus to provide a fully satisfactory response to the need outlined above, especially in connection with the possible measure of the received signal quality on the different beams and the simultaneous reception of the user data.

According to the present invention, that object is achieved by means of a method having the features set forth in the claims that follow. The invention also relates to a corresponding system, to be possibly included in a WLAN device. The claims are an integral part of the disclosure of the invention provided herein.

An embodiment of the invention is thus a method of processing an RF signal in a radio communication system, said signal being received by a plurality of antenna elements, including the steps of:

selecting a sub-set of received RF signals from said antennas elements, said sub-set including a given number of RF signals, combining the received RF signals of said selected sub-set into a single RF signal for demodulation, wherein said sub-set of received RF signals is selected by:

producing selective combinations of said received RF signals from said plurality of antenna elements by applying relative RF phase shift weights to the RF signals that are combined, wherein each combination includes RF signals received from a number of adjacent antenna elements equal to said given number, generating for each said selective combination of RF signals at least one radio performance indicator representative of the quality of the RF signals in the combination, and identifying the sub-set to be selected as a function of said at least one radio performance indicator generated for said selective combinations of said received RF signals.

An embodiment of the invention allows the continuous measurement of the received signal quality on the different beams.

In an embodiment, the measurement can be performed almost simultaneously with the reception of user data, by using a single RF chain, so that the received signal quality on some of the alternative beams can be measured continuously during the reception of the user data from the selected beam, with the addition of a small number of periodical measures of the signal quality on other alternative beams without simultaneous reception of the user data, without any service interruption or packet loss.

In an embodiment, a certain number of measurements on some alternative beams can be performed simultaneously with the reception of user data, by using a single RF chain and without any service interruption or packet loss, while a small number of measurements on other alternative beams can be periodically performed during the reception of the user data with a reduced impact on the quality of the received service.

An embodiment of the invention results in a fast tracking of the channel variations that turns into an improved QoS perceived by the user, particularly evident in case of real time services (e.g. audio/video).

BRIEF DESCRIPTION OF THE ANNEXED DRAWINGS

Further features and advantages of the present invention will be made clearer by the following detailed description of some examples thereof, provided purely by way of example and without restrictive intent. The detailed description will refer to the following figures, in which.

Figure 1:
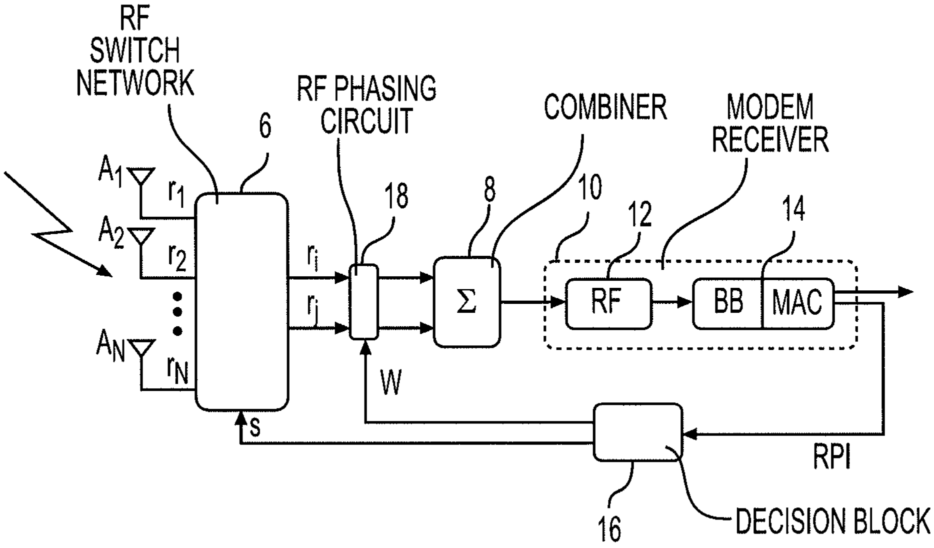
FIG. 1 illustrates schematically a switched beam antenna system realised according to the present invention employed in the downlink direction.
Figure 5A:
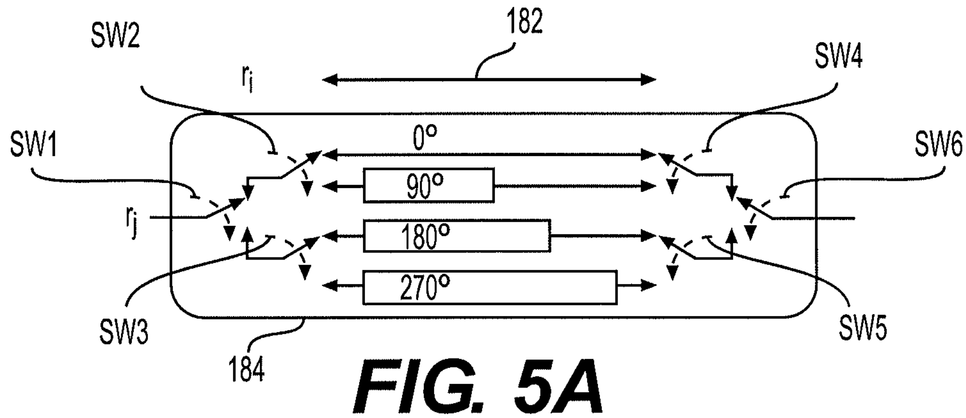
Figure 5B:
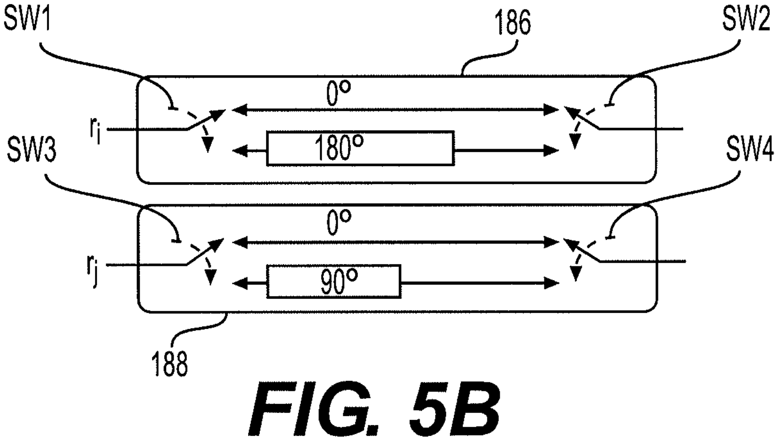
Figure 6:
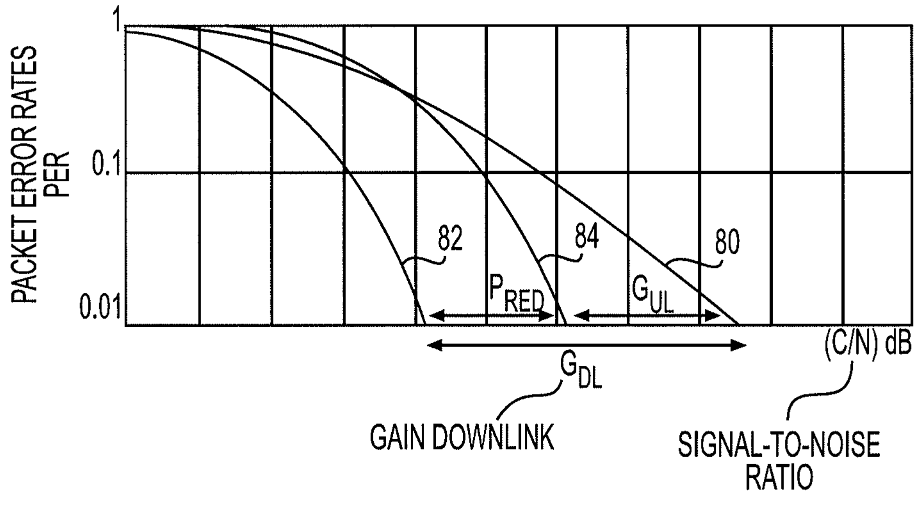
Figure 7:
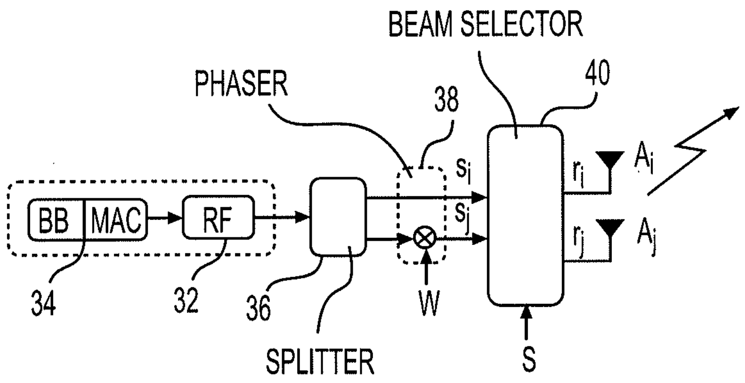

FIG. 4 includes two portions indicated 4*a* and 4*b* that show two alternative RF phasing circuits for the system of FIG. 1;

FIG. 5 includes two portions indicated 5*a* and 5*b* that show two possible implementations for the RF phasing networks of FIGS. 5*a* and 5*b*, respectively;

FIG. 6 illustrates power reduction, downlink and uplink gains in a reference switched beam antenna;

FIG. 7 illustrates schematically a switched beam antenna system realised according to the present invention employed in the uplink direction.

Figure 8A:
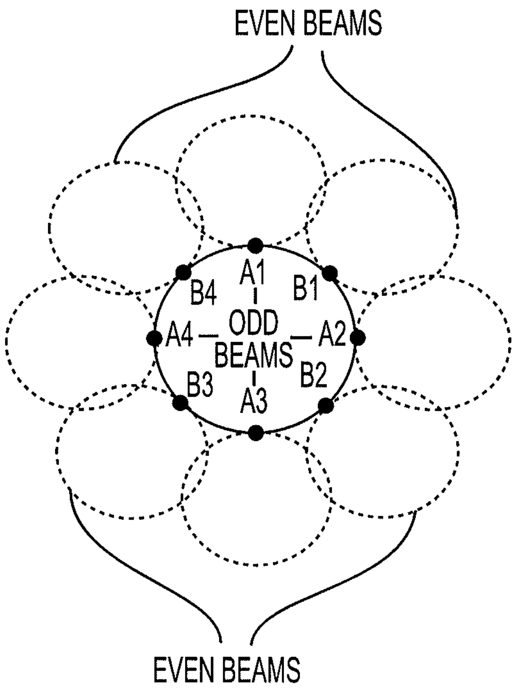
Figure 9:
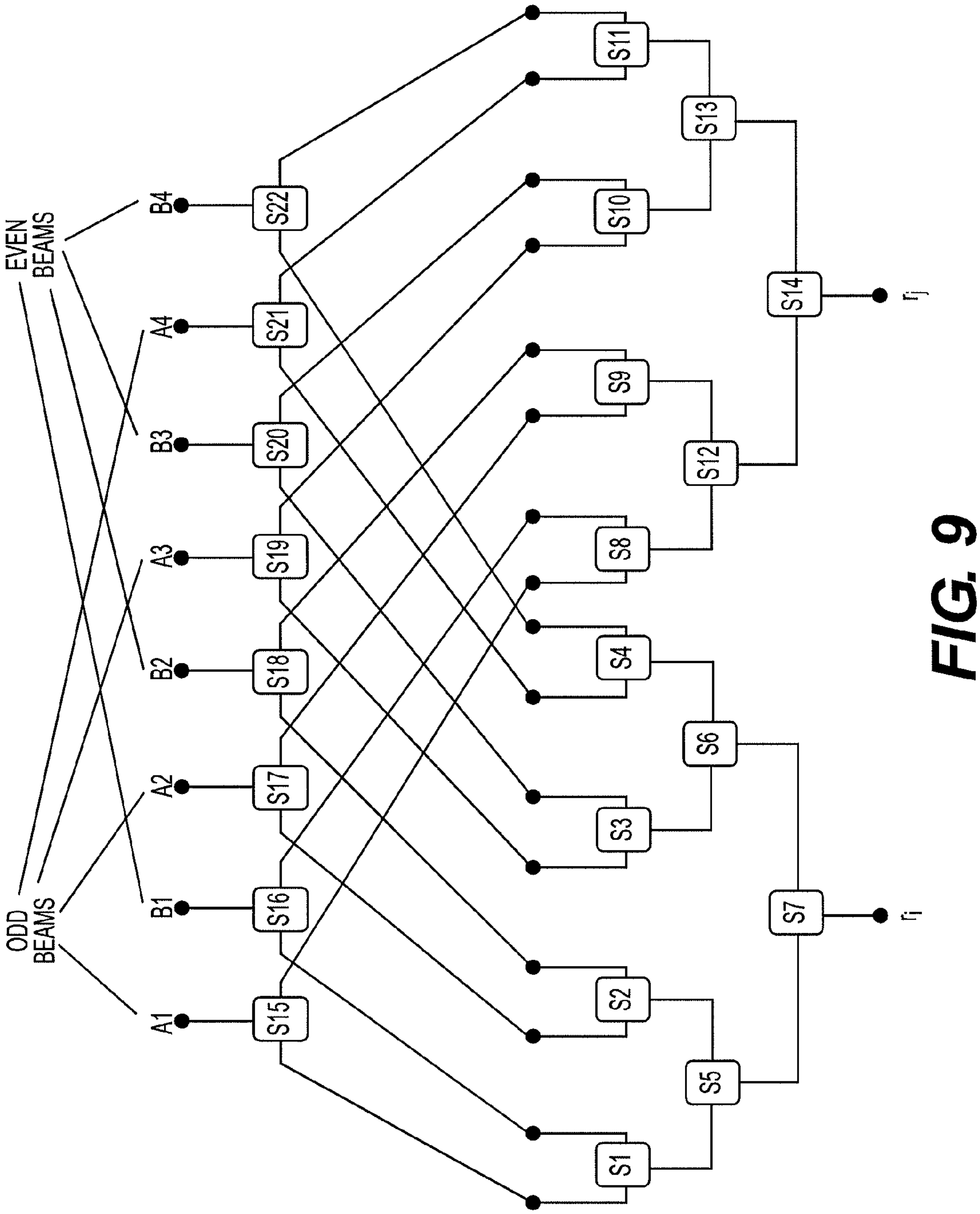

FIG. 8 includes two portions indicated 8*a* and 8*b* that illustrate a spatial antenna configuration and a related switching network;

FIG. 9 shows schematically a complete switching network for the antenna system of FIG. 8*a;*

Figure 11:
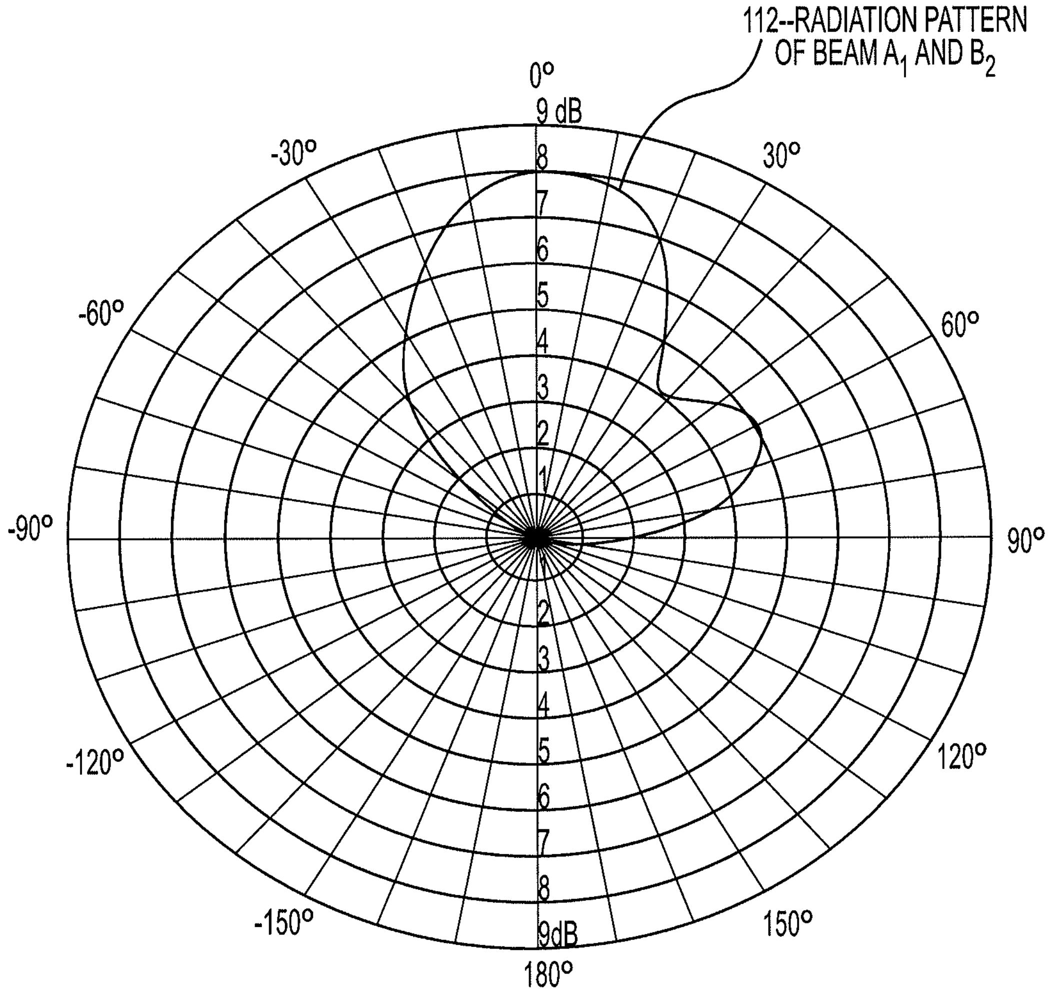

FIG. 10 includes two portions indicated 10*a* and 10*b* that show schematically a reduced complexity switching network for the antenna system of FIG. 8*a* and a related RF phasing network;

FIG. 11 shows a radiation pattern of the antenna system of FIG. 8*a;*

Figure 12:
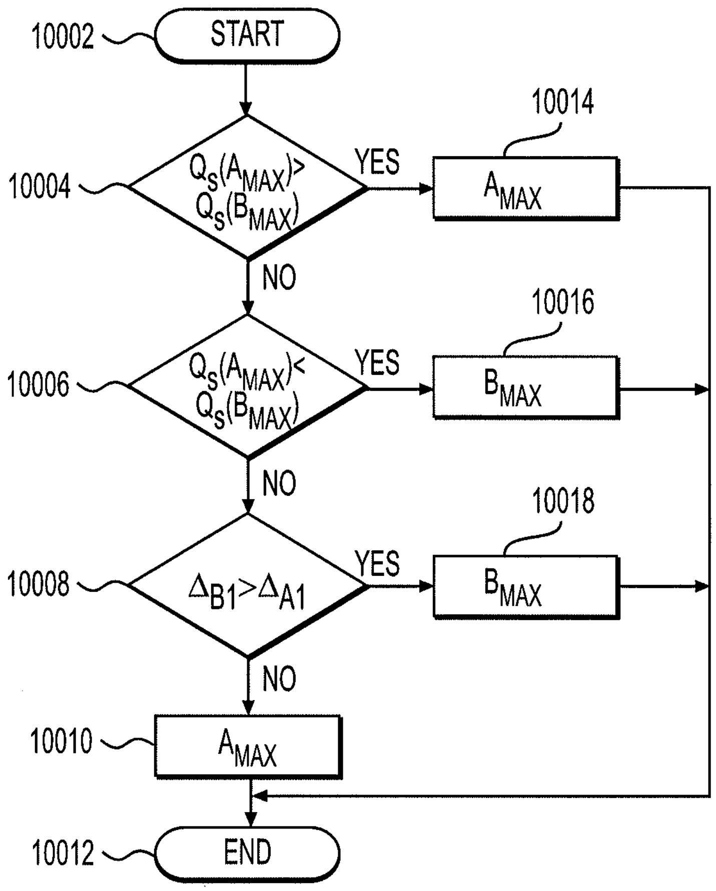
Figure 14:
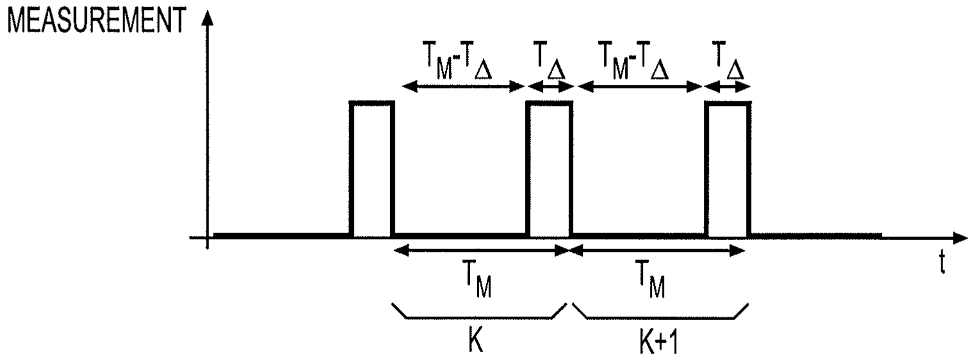
Figure 13:
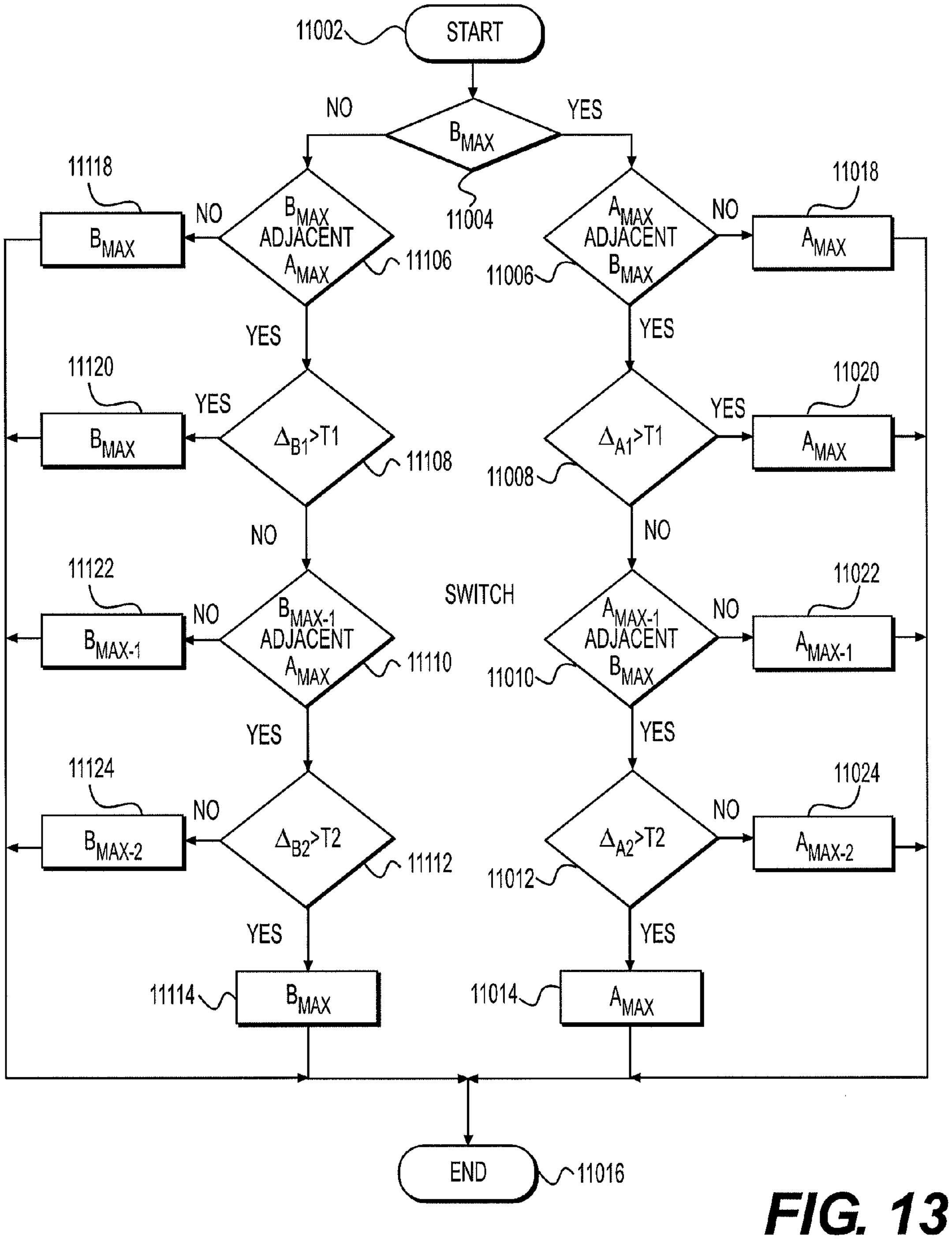
Figure 15:
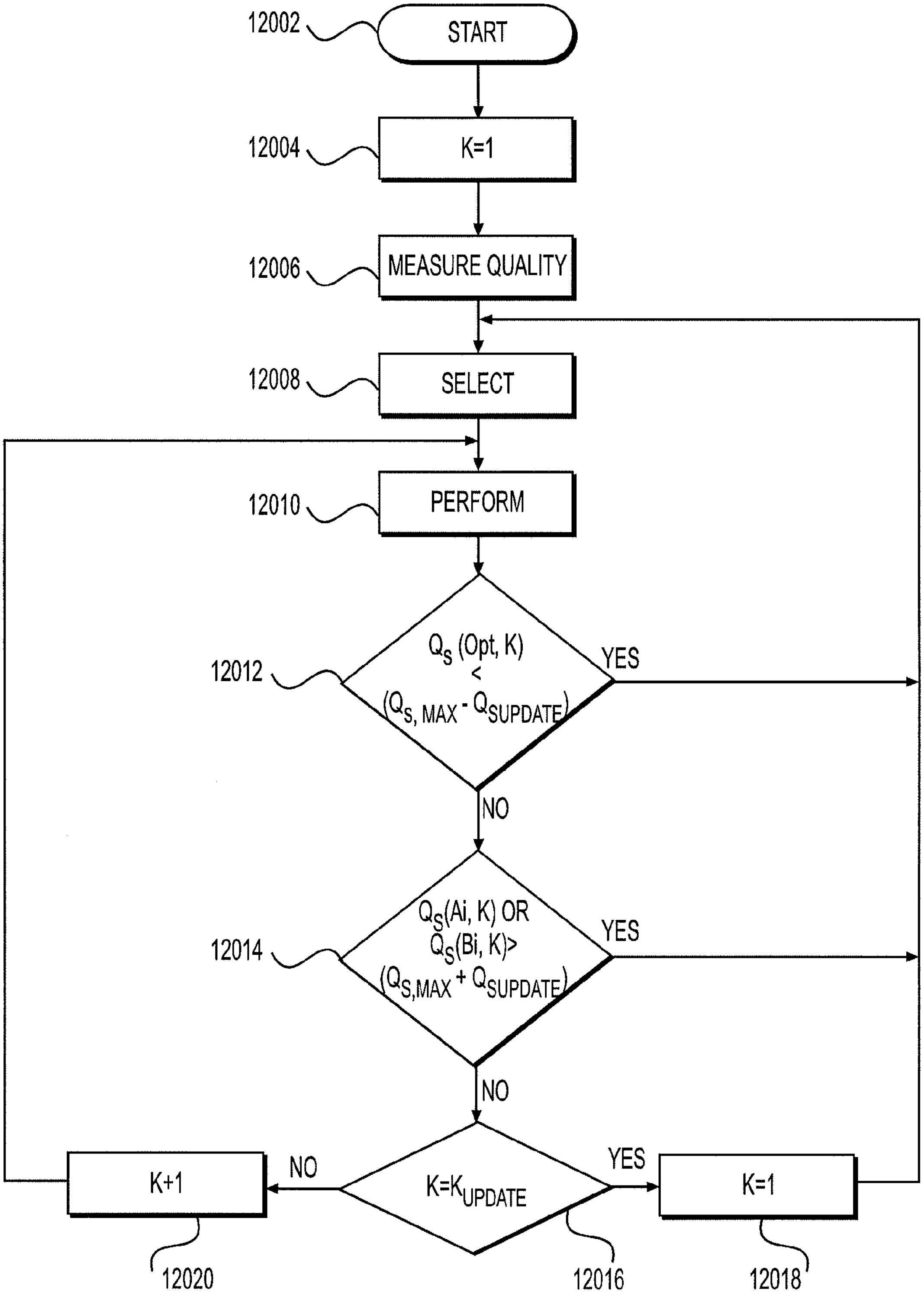

FIG. 12 is a flowchart of a method for the selection of a first beam,

FIG. 13 is a flowchart of a method for the selection of a second beam,

FIG. 14 is a schematic timing diagram of measurement cycles,

FIG. 15 is a flowchart of a measurement method, and

Figure 16:
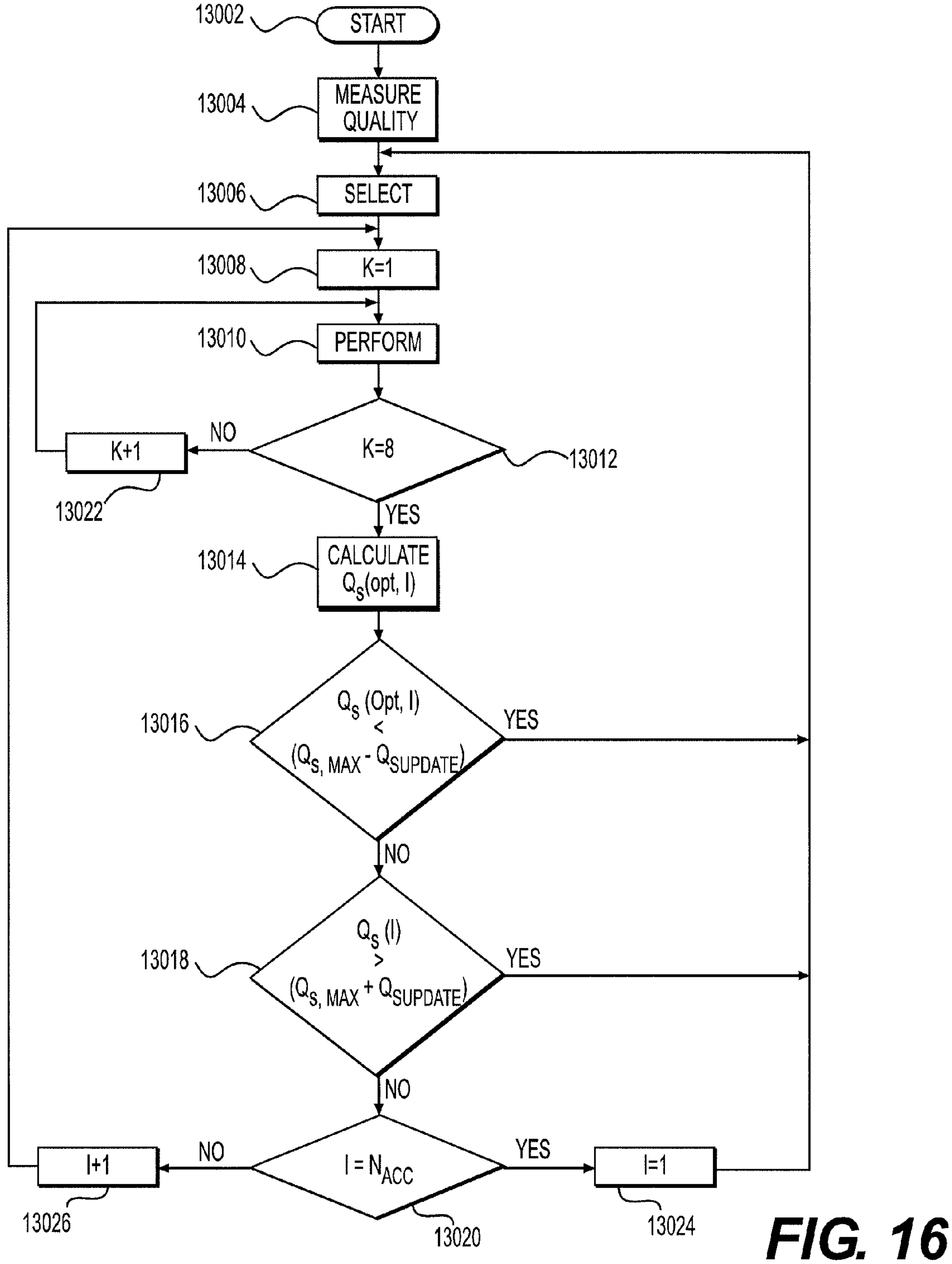

FIG. 16 is a flowchart of an alternative measurement method.

DETAILED DESCRIPTION OF EXEMPLARY EMBODIMENTS

With reference to FIG. 1, an exemplary embodiment of a multiple directional antenna system includes a plurality of directional antennas $A_1, \ldots, A_N$ which are preferably deployed in such a way that almost all the possible directions of arrival of the received signal are covered.

An exemplary field of application of the exemplary systems described herein is in a WLAN (Wireless LAN) transceiver compliant with the IEEE 802.11a/b/g or HIPERLAN/2 standards. However, the exemplary systems described herein can be employed also in a transceiver compliant with other wireless communication standards, such for example the UMTS/HSDPA (High Speed Downlink Packet Access) standard.

One issue in the deployment of WLAN networks is the limited coverage range due to the stringent regulatory requirements in terms of maximum EIRP (Equivalent Isotropic Radiated Power). The maximum EIRP of WLAN equipments (20 dBm in Europe) limits the coverage range especially in home environments due to the presence of several obstacles such as walls and furniture.

The adoption of advanced antenna solutions such as switched beam (SB) antennas palliates such a limitation. A SB antenna uses a set of N directional antennas $A_1, \ldots, A_N$ that cover all the possible directions of arrival of the incoming signals. A switched beam antenna architecture as illustrated in FIG. 1 can be employed to extend the coverage range of WLAN clients. The receiver is able to select the signal received from one of the directional antennas, by means of an RF switch, and to measure the corresponding signal quality at the output of the MAC layer. The signal quality is measured by means of a quality function $Q_S$ that depends on some physical (PHY) and MAC layer parameters such as received signal strength indicator (RSSI), Packet Error Rate (PER), MAC throughput (T) and employed transmission mode (TM):

$$Q_S=f(\text{RSSI, PER}, T, \text{TM})$$

In the following the assumption will be made that the higher the value of $Q_S$, the higher the quality of the received signal at application level.

Those skilled in the art will appreciate that other quality indicators may be used to calculate an alternative quality function. The function $Q_S$ may thus be used as a Radio Performance Indicator (RPI) to select the beams (i.e. the RF channels) and the RF phase shift weights to be applied. Other types of Radio Performance Indicators (RPI) may be used within the framework of the arrangement described herein. It will however be appreciated that, while being representative of the quality of the respective RF signal, such radio performance indicators as e.g. the Received Signal Strength Indicator (RSSI), Packet Error Rate (PER), Signal to Interference-plus-Noise ratio (SINR), MAC throughput (T) and employed transmission mode (TM), or any combination of the aforementioned performance indicators will be non-RF, i.e. Intermediate Frequency (IF) or BaseBand (BB) indicators.

In particular the RSSI is a measure of the received signal power that includes the sum of useful signal, thermal noise and co-channel interference. In the presence of co-channel interference, the RSSI is not sufficient to completely characterize the signal quality. For this reason the quality function $Q_S$ also exploits the Packet Error Rate (PER), the throughput (T) and the transmission modes (TM) measures that provide a better indication of the actual signal quality $Q_S$ in the presence of co-channel interference. For a IEEE 802.11 WLAN system the transmission mode corresponds to a particular transmission scheme, characterized by a particular modulation scheme (QPSK, 16 QAM, 64 QAM for example) and channel encoding rate (1/2, 3/4, 5/6 for example) that determine the maximum data rate at the output of PHY layer (6, 12, 18, 24, 54 Mbps for example). Similarly for a UMTS system the transmission mode corresponds to a particular value of transport format (TF) that determines the maximum data rate at the output of PHY layer (12.2, 64, 128, 384 kbps for example) while for the HSPDA system the transmission mode corresponds to a particular value of the channel quality indicator (CQI) that determines the maximum data rate at the output of PHY layer (325, 631, 871, 1291, 1800 kbps for example).

As indicated, a measure of the signal quality can be obtained at the BB and MAC levels by the WLAN chipset. A suitable software driver extracts from the WLAN chipset one (or a combination) of the aforementioned measurements and provides a software procedure, that typically runs on the microprocessor of the WLAN client or on the application processor of the device the WLAN modem is connected to, with these measurements that are the basis for the selection of a particular beam of the multiple directional antenna system. The software procedure, based on the measurement results provided by the WLAN chipset, selects a particular beam through a suitable peripheral (parallel interface, serial interface, GPIO interface) of the processor where the procedure that drives the RF switching network is executed.

Figure 2:
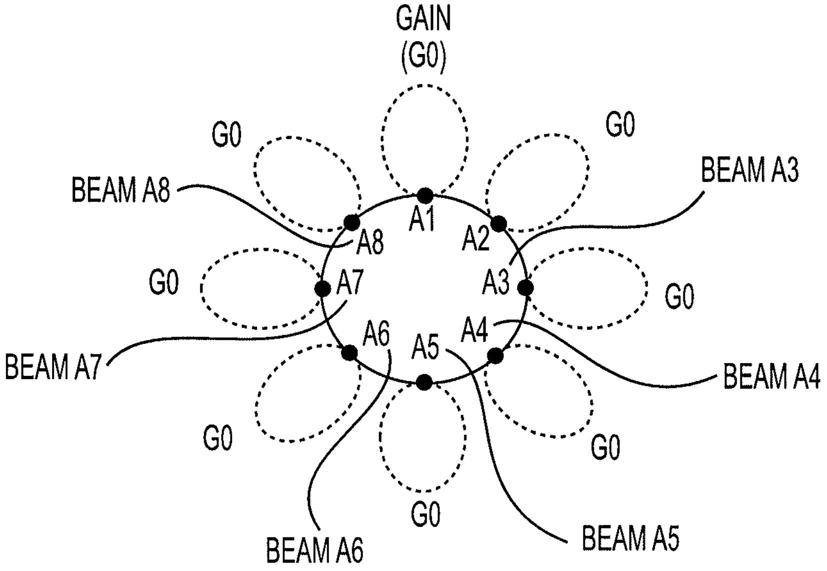
FIG. 2 illustrates a spatial antenna configuration for the antenna system of FIG. 1.

Several arrangements of the antenna subsystem can be conceived. An example is shown in FIG. 2 where N=8 directional antennas are uniformly placed on the perimeter of a circle to cover the entire azimuth plane. The eight antenna elements $A_1, \ldots, A_8$ are supposed identical. Preferably, the radiation diagram of each element is designed in order to maximize the gain of each beam (G0) and simultaneously to obtain an antenna gain as constant as possible for each Direction of Arrival (DOA) of the signals.

Signals $r_1, \ldots, r_N$ from antennas $A_1, \ldots, A_N$ are fed to a RF switching network 6 that allows the selection, by means of selection signal S, of a sub-set of signals, in particular two (or more than two) strongest beams providing the signals $r_i$ and $r_j$ that maximize a given radio performance indicator (RPI), as explained in detail hereinafter.

This decision is made in block 16 at base-band (BB) level by measuring one or more radio performance indicator (RPI) provided by a modem receiver 10, such as for example the Received Signal Strength Indicator (RSSI), the throughput or the Packet Error Rate (PER). A suitable recombination technique, applied at RF level, is then performed on the signals $r_i$, $r_j$ selected by the switching network. The recombined signal is then sent to a single RF processing chain 12 and demodulated through a conventional modem 14 which carries out the BB and MAC receiving operations.

The recombination technique, referenced hereinafter as Weighted Radio Frequency (WRF) combining, operates as follows. The two (or in general the sub-set) selected signals $r_i$ and $r_j$ are first co-phased, in block 18, by means of a multiplication operation for appropriate complex-valued weights, referenced globally by signal W in FIG. 1, and then added together in a combiner 8.

In fact, as the signal propagation takes place generally through multiple

Directions of Arrival (DOAs), such recombination technique, performed at RF level, gives a reduction of fading and produces an output signal with a better quality, even when none of the individual signals of the different DOAs are themselves acceptable. This is obtained by weighting the signals from different directions of arrival (two in the embodiment described herein but in general a subset of all directions) according to an appropriate complex value, co-phasing them individually and finally summing them together. The information will hence be gathered from the selected directions of arrival, each of which gives its own weighted contribution to the output signal.

The complex-valued weights W and the selection of the sub-set of beams, to be used in the co-phasing operation, are chosen with the goal of obtaining a radio performance indicator RPI comprised within a predetermined range, e.g. maximizing a particular indicator, or a combination of different indicators, such as the RSSI or the throughput, or by minimizing the PER of the combined signal.

Figure 4A:
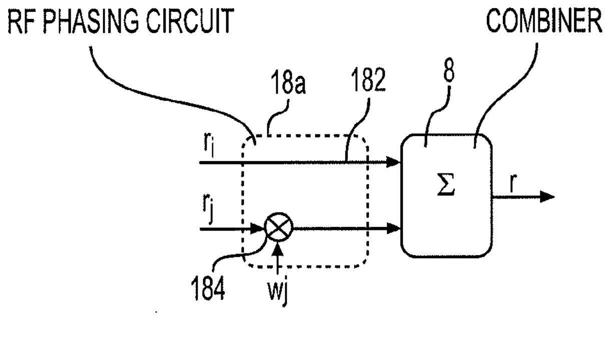

With particular reference to a first embodiment, shown in FIG. 4*a*, which illustrates a first version of the RF phasing circuit 18 of the system of FIG. 1, when two signals $r_i$ and $r_j$ are selected after the switching network 6. Specifically, in the first version of the RF phasing circuit 18*b*, one of the two signals r, is maintained as it is and the other, $r_j$ is co-phased by a complex-valued weight $w_j$ with unitary modulus.

Specifically, this might be achieved by passing the signal $r_i$ directly to the combiner 8 over a line 182, and multiplying the signal $r_j$ with the weight $w_j$ in a RF multiplier 184.

The two signals are then recombined in block 8 and sent to the single RF processing chain 12 and demodulated through the modem 14 which carries out the BB and MAC receiving operations, as shown in FIG. 1.

An embodiment of the beam selection technique will be detailed in the following.

As a result of the beam selection step, an optimal beam selection signal S and weight(s) W can be obtained e.g. from decision block 16.

In an embodiment, the complex-valued weights with unitary modulus can be introduced in a quantized form in order to use only a limited set of values. In particular, in order to define a quantization step providing a good trade-off between performance and complexity, the entire angle of 360° might be divided in a certain number L of quantized angular values corresponding to multiples of a certain elementary angle resolution with a value a=360°/L. It is evident that the L quantized angular values can be represented, with a binary notation, on a certain number of bits equal to $\log_2(L)$.

This elementary angle resolution a represents the discrete step to be applied at RF level in order to co-phase one of the selected signals(two signals will be considered herein, even though any plural number can be notionally used). In the case of unitary modulus complex-valued weight w, an optimal number L of quantized angular values introducing the phase shift for the co-phasing operation can be chosen, for example, by optimizing the performance, in terms of PER, computed on the combined signal.

Figure 3:
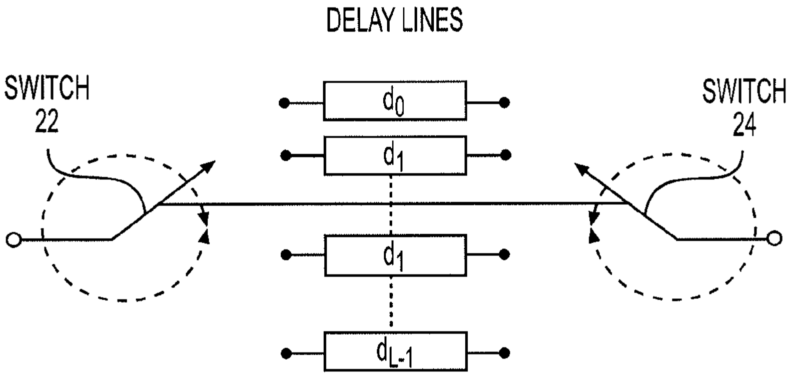
FIG. 3 shows a RF phasing network according to an aspect of the present invention.

The discrete phase shift step, to be applied at RF level in order to co-phase one of the two selected signals, can be obtained, for example, by exploiting a suitable RF co-phasing network that, for example, can be implemented according to the scheme shown in FIG. 3.

The implementation of the RF co-phasing network, shown in FIG. 3, can be, for instance, realized by means of two switches 22 and 24 with single input and L outputs (each switch is realised e.g by means of a PIN diode network) and L delay lines with different lengths introducing, on the received signal, a delay $d_i$ which is related to the corresponding value of RF phase rotation $w_i$ by the following equation:

$$w_i=\exp(-j\cdot 2\cdot p\cdot d_i\lambda) \text{ for } i=0, \ldots, L-1 \quad (1)$$

where λ is the wavelength of the signal carrier.

From equation (1) it follows that, in order to obtain quantized phase shift values corresponding to multiples of a certain elementary angle resolution a=360°/L so that $w_i=\exp(-j\cdot\phi_i)$ with $\phi_i$=360°/L·i, and i=0,1, . . . , L−1, values $d_i$ of delay given by the following equation are employed:

$$d_i=\lambda/L\cdot i \text{ for } i=0, \ldots, L-1 \quad (2)$$

The antenna architecture as described herein, while providing a performance improvement, advantageously requires only one RF processing chain, thus reducing the required complexity and related costs. Moreover, as no substantial modifications are required within the modem receiver 10, this solution can be applied on existing WLAN clients as an add-on device, reducing the required costs in the related deployment.

Figure 4B:
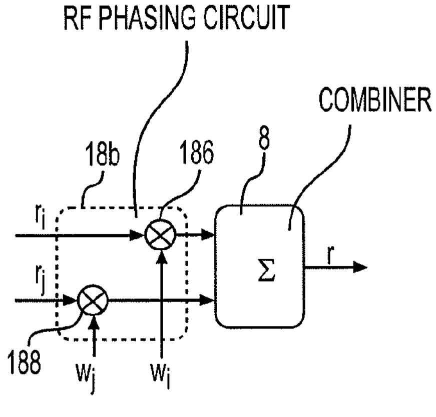

With reference to a second embodiment, shown in FIG. 4*b* which illustrates a second version of the RF phasing circuit 18 of the system of FIG. 1, both signals $r_i$ and $r_j$ are weighted by the weights $w_i$ and $w_j$ respectively.

Specifically, this might be achieved by multiplying the signal $r_i$ with the weight $w_i$ in a first RF multiplier 186 and the signal $r_j$ with the weight $w_j$ in a second RF multiplier 188.

In this case the signal at the output of the co-phasing network 18*b* and combining network 8 can be expressed as follows $$r=r_i\cdot w_i+r_j\cdot w_j$$

where the weighting factors can be expressed as complex phase shift weights $$w_i=\exp(ja)\ w_j\mathbf{32}\ \exp(j\beta)$$

and the signals at the output of the RF switching network can be expressed considering, for simplicity, only the phase term $$r_i=\exp(j\Theta_1)\ r_i=\exp(j\Theta_2)$$

The combined signal is then expressed as follows $$r=\exp(j\Theta_1+a)+\exp(j\Theta_2+\beta)$$

In order to coherently combine the two signals the following condition is fulfilled $$\Theta_1+a=\Theta_2+\beta=>\Theta_1-\Theta_2=a-\beta$$

As the phases of the two selected signals $\Theta_1$ and $\Theta_2$ are independent, it follows that the difference between the two phase weights a and β covers all the possible angles between 0° and 360·(L−1)/L $$a-\text{ß}\in\left[0°;\ \frac{360°\ (L-1)}{L}\right]$$

Several choices are possible for the phase weights a and β. For example if L=4, it is possible to use the following two phase sets $$a=\{0°, 180°\}\ \beta=\{0°, 90°\}$$

The difference between a and β takes a set of values that covers all the possible angles between 0° and 360·(L−1)/L $$a-\beta=\{0°,90°,180°,-90°\}=\{0°,90°,180°,270°\}$$

An advantage of the configuration shown in FIG. 4*b*, when compared to the configuration shown in FIG. 4*a*, is a reduction of the complexity of the RF switching network. A comparison in terms of number of RF switches for L=4 is given in FIGS. 5*a* and 5*b*.

The configuration in FIG. 5*a*, in which the phase shift is applied only on one signal $r_j$, requires 6 RF switches $SW_1, \ldots, SW_6$ with 1 input and 2 outputs. On the contrary, the configuration in which the phase shift is applied on both signals $r_i$ and $r_j$ requires only 4 RF switches $SW_1, \ldots, SW_4$ with 1 input and 2 outputs, as shown in FIG. 5*b*. In general, as the value of L increases, the reduced complexity of configuration 5*b* becomes more relevant.

It will be appreciated that, for the purposes of this description, a unitary real coefficient $w_{ij}$ with $\phi_{i,j}$ equal to zero will in any case be considered as a particular case for a phase shift weight.

In the exemplary embodiments as shown in FIGS. 5*a* and 5*b*, one or more "delay" lines will thus be present in the form of a line avoiding (i.e. exempt of) any phase shift, while the other delay lines will generate phase shifts of 90°, 180° and 270°, respectively.

Under the hypothesis of ideal channel reciprocity, i.e. the uplink transmission channel is equivalent to the downlink transmission channel, when using a Switched Beam WLAN client with a single beam for transmission and a single beam for reception, the uplink propagation path and the downlink propagation path can be assumed to have similar characteristics if the same beam is used for the reception and transmission links. Thus the gain $G_{DL}$, with respect to a single antenna WLAN client, achieved during the downlink reception when the WLAN client is equipped with a reference Switched Beam antenna architecture can be assumed true also when the same WLAN client is used as a transmitter in the uplink direction, gain $G_{UL}$, and the transmission occurs from the beam that has been previously selected during the downlink reception.

During the transmission of the WLAN client in the uplink direction, the specified EIRP maximum emission conditions can not be fulfilled. Thus a reduction of the transmitted power by a factor equal to $P_{red}$ is introduced. The reduction of the transmitted power affects the gain on the uplink direction. The above considerations lead to the following equations:

$$G_{DL}=G_{dB} \quad (3)$$

$$G_{UL}=G_{DL}-P_{red} \quad (4)$$

$$P_{red}=P_{client}+G_{ant}-20\text{ dBm} \quad (5)$$

where $G_{ant}$ is the gain of the single directional antenna employed and $P_{client}$ is the transmission power of the WLAN client.

A typical value for $P_{client}$ is between 16 and 18 dBm and $G_{ant}$ values vary between 6 dB and 10 dB. It is evident that these values lead to a power emission, given by $P_{client}+G_{ant}$, that clearly exceeds the 20 dBm limit.

For instance, for a value of $G_{ant}$ equal to 8 dB and a value of $P_{client}$ equal to 17 dBm, in the absence of cables loss, the EIRP transmitted by the WLAN client is equal to 25 dBm that exceeds the 20 dBm limit. In this particular case a power reduction $P_{red}$ equal to 5 dB has to be introduced.

According to equation (4) it is possible to conclude that, because of the power reduction $P_{red}$, the gain on the uplink direction $G_{UL}$ is correspondingly reduced by a factor equal to 5 dB.

The above considerations are summarized in FIG. 6, wherein curves 80, 82 and 84 represent packet error rates PER as a function of signal-to-noise ratio (S/N) for, respectively, a single antenna architecture, a reference Switched Beam (SB) antenna in downlink and a reference Switched Beam antenna in uplink. In order to achieve a given target PER the performance enhancement $G_{DL}$, gained in the downlink transmission by adopting a reference Switched Beam antenna instead of a single antenna receiver, is reduced by a factor equal to $P_{red}$ in the uplink direction because of the compliance with the EIRP limitation.

It is important to observe that the overall coverage range extension obtained is given by the minimum between the coverage range extension obtained on the downlink and uplink path. Since the downlink and uplink coverage ranges are strictly dependent on the corresponding values of gain $G_{DL}$ and $G_{UL}$, the overall gain $G_{SB}$ of a reference Switched Beam antenna can be defined with respect to a single antenna transceiver as follows:

$$G_{SB}=\min(G_{DL}, G_{UL}) \quad (6)$$

Combining equation (6) with equation (4), it is possible to write $G_{SB}$ as:

$$G_{SB}=G_{UL}=G_{DL}-P_{red} \quad (7)$$

As a consequence, when using WLAN clients equipped with a reference Switched Beam antenna architecture, the limiting link in terms of coverage is the uplink direction because of the reduction of the transmission power required in order to satisfy emission limitations.

In existing WLAN configurations, the clients typically use a single omni-directional antenna in the transmission towards the access point. Transmit diversity techniques can, instead, be used in the transmission path from the access point to the client (downlink). In these systems omni-directional antennas are used in order not to exceed the power emission limitations.

The switched beam antenna architecture according to the present invention, with WRF combining and single RF processing chain, described above with reference to FIG. 1, can also be used in the uplink direction during the transmission from the WLAN client to the Access Point, as shown schematically in FIG. 7.

The configuration shown in FIG. 7 is based on the same antenna architecture employed in the downlink direction, realized with a certain number of directional antennas which are deployed in a way that all the possible Directions of Departure (DOD) of the transmitted signal are covered. During the uplink transmission two antennas $A_i$ and $A_j$ (or in general a sub-set of antennas), selected by means of beam selector 40 among all the directional antennas $A_1, \ldots, A_N$ in correspondence of the two strongest received signals during the downlink reception, are used for transmission. In similar way the value of the complex weight w selected during the downlink reception is employed also for uplink transmission.

In particular, after the conventional BB and MAC modem 34 and the single RF processing chain 32, the signal to be transmitted is sent to a splitter 36 that divides it into two (or in general a plurality of) separate signals with the same power level, that is equal, in dBm, to $P_{client}-3$ dB. Thanks to the hypothesis of channel reciprocity, one of the two signals is digitally weighted exploiting the complex-valued weight w evaluated during the downlink reception, in phasing block 38. This enables the signals reaching the access point to be coherently recombined at the receiver end, leading to performance enhancement.

In any case the main benefit of this solution resides in the fact that the power transmitted from each of the two antennas of the antenna architecture according to the present invention is equal to half of the power transmitted by the single antenna of a reference Switched Beam antenna. This means that, in order to be compliant with the EIRP limitation, the power transmitted by each of the two antennas is reduced by the following quantity $$P_{red}=P_{client}-3\text{ dB}+G_{ant}-20\text{ dBm} \quad (8)$$

If the power reduction to be employed in the reference SB antenna, defined in equation (4), is compared with the power reduction to be employed in the SB antenna matter of the present invention defined in equation (8), it is possible to observe that, in the latter system, thanks to the fact that, for the transmission two directional antennas fed with half of the overall transmission power of the client are employed, the value of the power reduction is 3 dB smaller than the corresponding value to be employed in the former system. This is obtained thanks to the hypothesis that the overall power in each point of the azimuth plane does not overcome the maximum emission power of the single radiation element of the antenna system that has been dimensioned in order to satisfy the power emission limitations.

Since the gain in the uplink direction $G_{UL}$ is related to the gain in the downlink direction $G_{DL}$ by equation (4) it is possible to observe that a smaller reduction of the transmission power corresponds to a higher value of the uplink gain $G_{UL}$ and, in turn, to a larger value of the overall antenna gain $G_{SB}$ as defined in equation (7).

Therefore, the switched beam antenna architecture as described herein, thanks to the higher gain on the downlink direction $G_{DL}$ and to the larger power transmitted by each of the two directional antennas, has better performance, in terms of overall antenna gain $G_{SB}$ and therefore in terms of coverage range extension, with respect to a reference Switched Beam antenna.

In case the second version of the RF phasing circuit 18, the circuit of FIG. 4*b*, is used at the receiver, wherein both signals $r_i$ and $r_j$ are weighted by the weights $w_i$ and $w_j$ respectively, both signals coming from the splitter 36 are digitally weighted exploiting the complex-valued weights $w_i$ and $w_j$ evaluated during the downlink reception.

An embodiment of the procedure for beam selection will now be described in detail.

As indicated, the procedure for the beam selection is preferably periodically repeated in order to track the variations of the propagation channel so that a WLAN RF transceiver equipped with a SB antenna is continuously switched from one beam to another. The receiver sequentially selects the signals received at the different antennas $A_1, \ldots, A_N$ (e.g. the beams) and measures the signal quality. If the receiver is in idle state these measures can be performed by exploiting a beacon channel transmitted by the access point (AP). Comparing the signal quality measured over the various beams the receiver selects the antenna with the highest signal quality, which is used for data reception or transmission when the receiver switches from the idle state to the connected state.

In order to track the channel variations, the measure of the signal quality should be updated during the data transmission. The selection of the best antenna may require a significant time, in the order of several milliseconds (ms), during which many data packets may be lost. The quality of service (QoS) perceived by the user may then be degraded and this impairment may be particularly critical for real time services such as video and audio services.

The SB antenna architecture, described in the foregoing, reduces the previous impairment and also improves the conventional switched beam antenna architecture of FIG. 1 in terms of achievable coverage range and throughput. The basic idea is to select the beams (e.g. two beams) with the highest signal quality and to combine the corresponding signals at radiofrequency by means of suitable weights. The combining technique, denoted as Weighted Radio Frequency (WRF) combining, has been thoroughly described in the foregoing.

The RF signals $r_i$ and $r_j$, received from the two beams with the highest signal quality, are selected and combined at radiofrequency (RF) level by means of suitable weights $w_i$ and $w_j$.

Those of skill in the art will appreciate that while two beams are considered throughout the rest of this description for the sake of simplicity, the arrangement disclosed can be notionally applied to any plural number of beams (i.e. RF signals) to be selected and then co-phase and combined.

The weights $w_i$ and $w_j$ are determined in order to coherently combine (e.g. with the same phase) the two signals $r_i$ and $r_j$. The beam selection and the determination of the optimal combining weights is still based on the quality function $Q_S$ that depends on PHY and MAC layer parameters such as received signal strength (RSSI), Packet Error Rate (PER), MAC throughput (T) and employed transmission mode (TM).

The weighting operation, shown schematically in FIG. 4*b* as the multiplication by a suitable weighting factor, is implemented in practice by introducing a phase shift on one or on both the received signals. The phase shift can be obtained by propagating the received signals through a transmission line stub of suitable length. In order to generate a set of weights, corresponding to phase shifts comprised between 0 and 360 degrees, a set of transmission line stubs with different lengths is introduced on the signal path. The transmission line stubs are connected to the signal path by means of appropriate RF switching elements. A possible realization of the RF weighting unit is shown in FIG. 3. The i-th transmission line stub introduces on the RF signal a phase shift equal to $$a_i = \frac{360°}{L} \cdot i \qquad (8)$$

for i=0, . . . , L−1, where L is the number of values used to quantize all the possible phase shifts in the range between 0 and 360(L−1)/L degrees. After the weighting operation the two signals are combined by means of an RF combining unit and provided to the RF receiver.

The arrangements described in the following provide the possibility of measuring the signal quality and the corresponding beam selection operation that allows the simultaneous reception of the user data. The method allows a faster track of the channel variations without any service interruption that instead affects the conventional SB antenna architecture.

By way of example, the beam selection method will be described in the following for a SB antenna with WRF combining having N=8 directional antennas. Such a antenna configuration with its radiation pattern is shown in FIG. 8*a*, where, for simplicity, the odd beams are denoted with the letter $A_i$ where i=1,2,3,4 while the even beams are denoted with the letter $B_i$ where i=1,2,3,4.

From an implementation point of view, different possible solutions can be employed to realize the switching network. In the following, some reference schemes will presented for illustrative purposes.

Figure 8B:
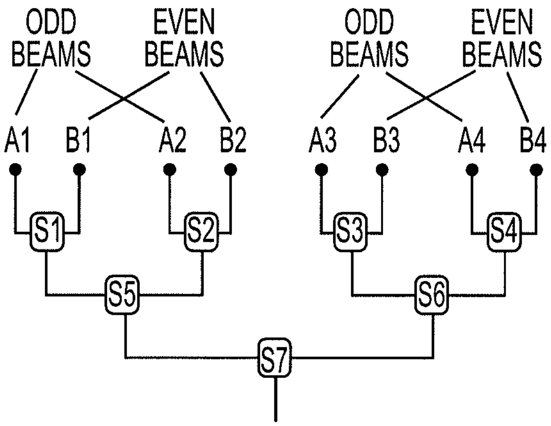

The first switching network scheme, shown in FIG. 8*b*, can be employed with a Switched Beam WLAN client with a single beam for transmission and a single beam for reception. As seen before, this architecture allows the selection of the beam providing the signal that maximizes a given radio performance indicator. Once the beam providing the best value of QoS performance indicators has been selected, the related received signal feeds the single RF processing chain and then it is demodulated by the conventional WLAN modem. Thus an “8 to 1” switching network configuration is employed. With current state of the art RF technology, this solution introduces a basic attenuation equal to e.g. 0.35 dB, for each switching layer realized at RF level. It follows that this configuration might introduce an overall attenuation of approximately 1.05 dB.

The second switching network scheme, shown in FIG. 9, can be employed within the switched beam antenna architecture for a WLAN client equipped with Weighted Radio Frequency (WRF) combining shown in FIG. 1. As seen before, this architecture allows the selection of the two beams providing the signals that maximize a given radio performance indicator. Once these beams providing the best value of QoS performance indicator have been selected, the related received signals are first co-phased, by means of a multiplication operation for appropriate complex-valued weights (implemented in the form of a suitable delay introduced at RF), added together and then sent to the single RF processing chain. Thus an “8 to 2” switching network configuration is employed. The switching network shown in FIG. 9 is the more general switching scheme between 8 input signals and 2 output signals. Notice that with this configuration all the possible combinations of signals at the input ports can be switched to the output ports. In order to obtain this flexibility, 22 RF switches are used where every single RF switch introduces a basic attenuation, equal to e.g. 0.35 dB. It follows that this configuration introduces an overall attenuation of approximately 1.4 dB, which is a larger value than that obtained with the previous solution shown in FIG. 8*b*. This is due to the introduction of one additional switching layer at RF. Moreover the control of the switching network requires a large number of control signals that has an impact on the selection of the peripheral (parallel interface, serial interface, GPIO interface) connecting the antenna system with the micro-controller or application processor executing the software procedure that, based on the measurement results provided by the WLAN chipset, selects the beams and the corresponding weighting factor of the antenna system.

Figure 10A:
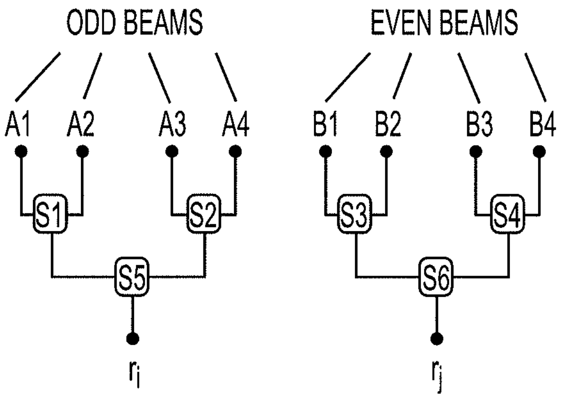
Figure 10B:
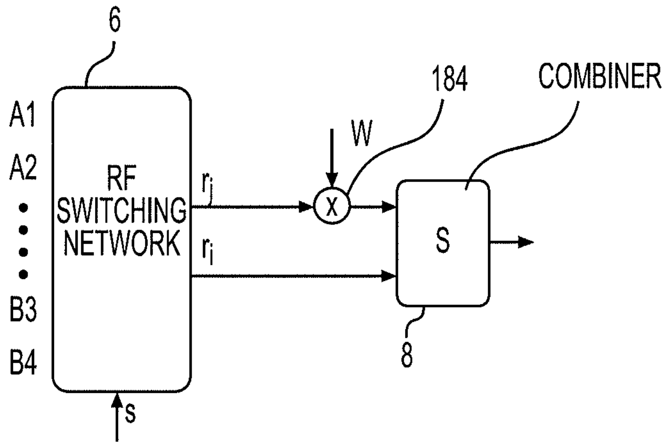

The third switching network scheme, shown in FIG. 10*a*, has been specifically conceived for the switched beam antenna architecture with Weighted Radio Frequency (WRF) combining shown in FIG. 1 in the particular case of the antenna system with 8 directional antennas shown in FIG. 8*a*. In order to reduce the large attenuation value introduced by the previous architecture shown in FIG. 9, the input signals are grouped in two sub-sets $A=\{A_1,A_2,A_3,A_4\}$ and $B=\{B_1,B_2,B_3,B_4\}$ as it is possible to observe in FIG. 10*a* and in FIG. 8*a*. Each of these subsets feeds a simplified "4 to 1" switching sub-network, which introduces an overall attenuation of approximately 0.7 dB because each switching layer implemented at RF introduces a basic attenuation of e.g. 0.35 dB and only 2 switching layers are employed. On the contrary, the main drawback of this suboptimal switching network resides in the fact that not all the combinations of the signals at the input ports can be switched to the output ports. Based on how the signals are sent to the two switching sub-networks, the signals obtained at the output ports can be chosen among, for instance, adjacent or alternated beams. In particular, the solution illustrated in the FIG. 10*a* enables adjacent beams to be selected.

In any case, in realistic propagation scenarios where the Directions of Arrival (DOAs) of the two strongest received signals are angularly distributed in a uniform way, the suboptimal switching network shown in FIG. 10*a*, besides introducing a lower attenuation with respect to the first and the second switching architectures, is able to achieve quasi-optimal performance in terms of achievable diversity order. Under the assumption that the DOAs of the two strongest received signals are angularly distributed in a uniform way with a certain angular spread so that each signal is received at least by two adjacent beams, one belonging to the subset A and one belonging to the subset B, it is always possible to receive the two strongest signals (provided that they are angularly separated in the azimuth plane by more than 90°) and to recombine them at RF level in a coherent way by selecting a suitable combination of one beam of the subset A and one beam of the subset B. Whenever the second strongest received signal is received by a beam connected to same switching sub-network (for example the first) of the first strongest received signal, because of the angular spread, it is possible to receive a significant fraction of the corresponding energy by selecting the adjacent beam connected to the different switching sub-network (in this example the second).

In the following will be described the procedures for measuring the signal quality and determining the optimal beams and weighting factor in the particular case of the SB antenna with Weighted Radio Frequency (WRF) combining shown in FIG. 1, equipped with the antenna system shown in FIG. 8*a* (characterized by 8 receiving antennas with directional radiating diagrams), and employing the switching network shown in FIG. 10*a*. Moreover it will be assumed that the RF combining unit has the architecture shown in FIG. 10*b* where only one complex coefficient w=exp(jf), where the phase f assumes 4 quantized values $f\in\{0°,90°,180°,270°\}$, is used to rotate the phase of the signal $r_j$, received from one of the beams of the subset B, while the signal $r_i$, received from one of the beams of the subset A, directly feeds the second input of the RF combiner shown in FIG. 10*b*. Those skilled in the art will however appreciate that the proposed procedures might be adapted to other switching networks and to complex coefficient w where the phase f might assume more or less than 4 quantized values.

The procedure for determining the configuration of beams and weighting coefficients that currently is the optimal one, i.e. that maximizes a certain quality function $Q_S$ measured by the BB and MAC modules of the receiver, can be divided in two different sub-procedures to be followed respectively in the case of idle mode state or active mode state. In particular a WLAN client or mobile station (STA) is in idle mode state immediately after being switched on or when it is not used for exchanging data with the access point (AP). In a similar way a WLAN STA is in active mode state when a radio link is established for the exchange of data with the AP. The main difference between the two procedures lies in the fact that, during the active mode state, the WLAN STA is exchanging data with the AP and therefore the periodic measurements of the received signal quality on beams different from those selected for the reception of the user data (alternative beams) have to be performed during the reception of the user data from the selected beams.

It is possible to observe that when two adjacent beams $(A_i,B_j)$ of the SB antenna are selected, depending on the phase value $f_k$ of the complex coefficient $w_k=\exp(jf_k)$ it is possible to obtain an equivalent radiation pattern, characterized by the parameters $(A_i,B_j)$ and $f_k$ with a better angular resolution than the radiation pattern of the different beams $(A_1,A_2,A_3,A_4)$ and $(B_1,B_2,B_3,B_4)$. For every equivalent radiation pattern characterized by the parameters $(A_i,B_j)$ and $f_k$ it is possible to identify a Direction of Arrival (DOA) corresponding to the direction of the maximum value of the radiation pattern itself.

The correspondence between the parameters $(A_i,B_j)$, $f_k$ and the DOA is shown in table 1. The table shows also that the 24 set of parameters corresponding to the 24 lines of the table provide an antenna configuration able to completely scan the azimuth plane with a resolution of approximately 15°.

TABLE 1

Correspondence between the parameters (Ai,Bj), f k and the DOA.

| Beam $A_i$ | Beam $B_j$ | Phase $f_k$ | DOA |
|---|---|---|---|
| A1 | B1 | ϕ = 270° | 6.2° |
| A1 | B1 | ϕ = 0° | 22.5° |
| A1 | B1 | ϕ = 90° | 38.8° |
| A2 | B1 | ϕ = 90° | 51.2 |
| A2 | B1 | ϕ = 0° | 67.5° |
| A2 | B1 | ϕ = 270° | 83.8 |
| A2 | B2 | ϕ = 270° | 96.2 |
| A2 | B2 | ϕ = 0° | 112.5° |
| A2 | B2 | ϕ = 90° | 128.8 |
| A3 | B2 | ϕ = 90° | 141.2 |
| A3 | B2 | ϕ = 0° | 157.5 |
| A3 | B2 | ϕ = 270° | 173.8 |
| A3 | B3 | ϕ = 270° | 186.2 |
| A3 | B3 | ϕ = 0° | 202.5 |
| A3 | B3 | ϕ = 90° | 218.8 |
| A4 | B3 | ϕ = 90° | 231.2 |
| A4 | B3 | ϕ = 0° | 247.5 |
| A4 | B3 | ϕ = 270° | 263.8 |
| A4 | B4 | ϕ = 270° | 276.2 |
| A4 | B4 | ϕ = 0° | 292.5 |

TABLE 1-continued

Correspondence between the parameters (Ai,Bj), f k and the DOA.

| Beam $A_i$ | Beam $B_j$ | Phase $f_k$ | DOA |
|---|---|---|---|
| A4 | B4 | $\phi = 90°$ | 308.8 |
| A1 | B4 | $\phi = 90°$ | 321.2 |
| A1 | B4 | $\phi = 0°$ | 337.5 |
| A1 | B4 | $\phi = 270°$ | 353.8 |

In order to define particular values of the parameters ($A_i$, $B_j$), $f_k$ generating radiation patterns being equivalent to those obtained with the single beams $A_i$ or $B_j$, three cases denoted in the following as Case 1, Case 2 and Case 3 might be considered:

Case 1: In this first case the equivalent radiation pattern of a single beam $A_i$ or $B_j$ with i=1,2,3,4 and j=1,2,3,4 can be obtained as the average value of the two radiation patterns obtained with the parameters indicated in the corresponding 2 lines of table 2. The average value has to be intended in the following way: the quality function $Q_S$ obtained in correspondence of the equivalent radiation pattern of a single beam $A_i$ or $B_j$ can be computed as the average of the quality functions $Q_{S1}$ and $Q_{S2}$ measured in correspondence of the parameters indicated in the corresponding 2 lines of table 2.

TABLE 2

First correspondence between the parameters ($A_i$,$B_j$), $f_k$ and the equivalent beams.

| Equivalent Beam | Beam $A_i$ | Beam $B_j$ | Phase $f_k$ | DOA |
|---|---|---|---|---|
| A1 | A1 | B4 | $\phi = 270°$ | 353.8 |
| | A1 | B1 | $\phi = 270°$ | 6.2° |
| B1 | A1 | B1 | $\phi = 90°$ | 38.8° |
| | A2 | B1 | $\phi = 90°$ | 51.2 |
| A2 | A2 | B1 | $\phi = 270°$ | 83.8 |
| | A2 | B2 | $\phi = 270°$ | 96.2 |
| B2 | A2 | B2 | $\phi = 90°$ | 128.8 |
| | A3 | B2 | $\phi = 90°$ | 141.2 |
| A3 | A3 | B2 | $\phi = 270°$ | 173.8 |
| | A3 | B3 | $\phi = 270°$ | 186.2 |
| B3 | A3 | B3 | $\phi = 90°$ | 218.8 |
| | A4 | B3 | $\phi = 90°$ | 231.2 |
| A4 | A4 | B3 | $\phi = 270°$ | 263.8 |
| | A4 | B4 | $\phi = 270°$ | 276.2 |
| B4 | A4 | B4 | $\phi = 90°$ | 308.8 |
| | A1 | B4 | $\phi = 90°$ | 321.2 |

Case 2: In this second case the equivalent radiation pattern of a single beam $A_i$ or $B_j$ with i=1,2,3,4 and j=1,2,3,4 can be obtained with the parameters indicated in table 3.

TABLE 3

Second correspondence between the parameters (Ai,Bj), f k and the equivalent beams.

| Equivalent Beam | Beam $A_i$ | Beam $B_j$ | Phase $f_k$ | DOA |
|---|---|---|---|---|
| A1 | A1 | B1 | $\phi = 270°$ | 6.2° |
| B1 | A2 | B1 | $\phi = 90°$ | 51.2 |
| A2 | A2 | B2 | $\phi = 270°$ | 96.2 |
| B2 | A3 | B2 | $\phi = 90°$ | 141.2 |
| A3 | A3 | B3 | $\phi = 270°$ | 186.2 |
| B3 | A4 | B3 | $\phi = 90°$ | 231.2 |
| A4 | A4 | B4 | $\phi = 270°$ | 276.2 |
| B4 | A1 | B4 | $\phi = 90°$ | 321.2 |

FIG. 11 illustrates in that respect the radiation pattern for the first row of table 3. Specifically, line 112 in FIG. 11 shows the radiation pattern of a combination of Beam $A_1$, and $B_2$ shifted by $\phi$=270° (i.e. the equivalent beam of $A_1$).

Case 3: In this third case the equivalent radiation pattern of a single beam $A_i$ or $B_j$ with i=1,2,3,4 and j=1,2,3,4 can be obtained with the parameters indicated in table 4.

TABLE 4

Third correspondence between the parameters ($A_i$,$B_j$), $f_k$ and the equivalent beams.

| Equivalent Beam | Beam $A_i$ | Beam $B_j$ | Phase $f_k$ | DOA |
|---|---|---|---|---|
| A1 | A1 | B4 | $\phi = 270°$ | 353.8 |
| B1 | A1 | B1 | $\phi = 90°$ | 38.8° |
| A2 | A2 | B1 | $\phi = 270°$ | 83.8 |
| B2 | A2 | B2 | $\phi = 90°$ | 128.8 |
| A3 | A3 | B2 | $\phi = 270°$ | 173.8 |
| B3 | A3 | B3 | $\phi = 90°$ | 218.8 |
| A4 | A4 | B3 | $\phi = 270°$ | 263.8 |
| B4 | A4 | B4 | $\phi = 90°$ | 308.8 |

According to one of the aforementioned three cases it is therefore possible to drive the SB antenna system with possible sets of parameters ($A_i$,$B_j$), $f_k$ where each set of parameters generates a radiation pattern equivalent to that of a particular beam $A_i$ or $B_j$. In this way it is therefore possible to associate a particular value of the quality function $Q_S$ to every single beam $A_i$ or $B_j$ with i=1,2,3,4 and j=1,2,3,4 of the antenna system. In the following, the value of quality function $Q_S$ associated to the beam $A_i$ will be denoted as $Q_S(A_i)$ and the value of the quality function associated to the beam $B_j$ as $Q_S(B_j)$.

In an arrangement, the 8 values of the quality function $Q_S$ for every beam of the SB antenna system are calculated, which generates the corresponding 8 quality functions $$Q_S(A_1), Q_S(A_2), Q_S(A_3), Q_S(A_4)$$

$$Q_S(B_1), Q_S(B_2), Q_S(B_3), Q_S(B_4)$$

These 8 quality functions associated to the 8 beams of the SB antenna system are then preferably divided in two subsets corresponding respectively to the beams $A_i \epsilon \{A_1,A_2,A_3,A_4\}$ and $B_j \epsilon \{B_1,B_2,B_3,B_4\}$. The quality functions belonging to these different subsets are then sorted in decreasing order obtaining $$Q_S(A_{MAX}), Q_S(A_{MAX-1}), Q_S(A_{MAX-2}), Q_S(A_{MAX-3})$$

$$Q_S(B_{MAX}), Q_S(B_{MAX-1}), Q_S(B_{MAX-2}), Q_S(B_{MAX-3})$$

Moreover the following quantities may be defined $$\Delta_{A1}=Q_S(A_{MAX})-Q_S(A_{MAX-1})$$

$$\Delta_{A2}=Q_S(A_{MAX})-Q_S(A_{MAX-2})$$

$$\Delta_{B1}=Q_S(B_{MAX})-Q_S(B_{MAX-1})$$

$$\Delta_{B2}=Q_S(B_{MAX})-Q_S(B_{MAX-2})$$

In the following a numerical example will be provided in order to explain the previously described method. For example the measures of the quality function $Q_S$ of the 8 beams of the SB antenna system, employing the procedure previously described, for example in the particular case of the correspondence between the parameters ($A_i$,$B_j$), $f_k$ and the equivalent beams described in table 4 (i.e. Case 3), provide the following quality functions:

$$Q_S(A_1)=2, Q_S(A_2)=18, Q_S(A_3)=16, Q_S(A_4)=13$$

$$Q_S(B_1)=10, Q_S(B_2)=18, Q_S(B_3)=8, Q_S(B_4)=15$$

Then the 2 subsets of quality functions corresponding respectively to the beams $A_i \in \{A_1, A_2, A_3, A_4\}$ and $B_j \in \{B_1, B_2, B_3, B_4\}$ are sorted $$Q_S(A_2)=18,\ Q_S(A_3)=16,\ Q_S(A_4)=13,\ Q_S(A_1)=2$$

$$Q_S(B_2)=18,\ Q_S(B_4)=15,\ Q_S(B_1)=10,\ Q_S(B_3)=8$$

so that $$A_{MAX}=A_2,\ A_{MAX-1}=A_3,\ A_{MAX-2}=A_4,\ A_{MAX-3}=A_1$$

$$B_{MAX}=B_2,\ B_{MAX-1}=B_4,\ B_{MAX-2}=B_1,\ B_{MAX-3}=B_3$$

and $$\Delta_{A1}=2,\ \Delta_{A2}=5,\ \Delta_{B1}=3,\ \Delta_{B2}=8$$

With the information about the quality functions $$Q_S(A_{MAX}),\ Q_S(A_{MAX-1}),\ Q_S(A_{MAX-2}),\ Q_S(A_{MAX-3})$$

$$Q_S(B_{MAX}),\ Q_S(B_{MAX-1}),\ Q_S(B_{MAX-2}),\ Q_S(B_{MAX-3})$$

and the quantities $\Delta_{A1}$, $\Delta_{A2}$, $\Delta_{B1}$, $\Delta_{B2}$ it is possible to select the optimal beams $A_{opt}$ and $B_{opt}$ generating the associated optimal signals $r_{iopt}$ and $r_{jopt}$ according to the method described with respect to the flowcharts shown in FIGS. 12 and 13. Generally, arrows in the flowcharts starting from a condition will have the denomination "YES" if the outcome of the verification is true, and "NO" if the outcome is false.

In particular the method can be conceptually divided in 2 phases. In the first phase, according to the flowchart described in FIG. 12, the decision about the first selected beam (denoted in the following as beam 1) is taken.

Specifically, after a start step 10002, the first beam is selected to $A_{MAX}$ at step 10014 if the condition $Q_S(A_{MAX})>Q_S(B_{MAX})$ denoted 10004 is true. On the contrary, if the further condition $Q_S(A_{MAX})<Q_S(B_{MAX})$ denoted 10006 is true, the first selected beam is set to $B_{MAX}$ at step 10016.

In the particular case of $Q_S(A_{MAX})=Q_S(B_{MAX})$ (i.e. neither the condition 10004 nor the condition 10006 is satisfied), the quantities $\Delta_{A1}$ and $\Delta_{B1}$ are compared at step 10008. Specifically, the beam $B_{MAX}$ is selected at step 10018 if the difference of the quality functions relative to the beams $B_{MAX}$ and $B_{MAX-1}$ is larger than the difference of the quality functions relative to the beams $A_{MAX}$ and $A_{MAX-1}$. Else, the beam 1 is selected to $A_{MAX}$ at step 10010. Specifically, condition 10008 might verify if $\Delta_{B1}$ is greater than $\Delta_{A1}$.

After the selection of beam 1 the procedure is terminated for all conditions at step 10012.

The last condition 10008 means that the first selected beam has a quality function with the largest difference from the quality function of the second beam in the same subset. In this way the candidates for the second selected beam (denoted in the following as beam 2) belong to the different subset with respect to that of the beam 1 and present values of the quality function $Q_S$ with a smaller dispersion with respect to those of the first subset. This condition ensures a good selection of the optimal beams $A_{opt}$ and $B_{opt}$ also in the particular case of $Q_S(A_{MAX})=Q_S(B_{MAX})$.

Also the second phase, according to the flowchart shown in FIG. 13, starts from a start step 11002. If the beam 1 is equal to $B_{MAX}$, the right hand side (RHS) of the flowchart is executed. On the contrary if the beam 1 is equal to $A_{MAX}$ then the left hand side (LHS) of the flowchart shown in FIG. 13 is executed. Such a verification is performed by a condition 11004.

In the following, it will be supposed that the beam 1 is equal to $B_{MAX}$ and the flow chart on the right hand side of FIG. 13 will be described. Specifically, $A_{MAX}$ is selected at step 11018, if $A_{MAX}$ is not adjacent to $B_{MAX}$, i.e. negative outcome of a condition 11006, which verifies if $A_{MAX}$ is adjacent to $B_{MAX}$.

If $A_{MAX}$ is adjacent to $B_{MAX}$ (i.e. positive outcome of condition 11006) then $A_{MAX}$ is not immediately selected as beam 2, because the presence of a further beam of the subset A with a good value of the quality function $Q_S$ and a higher angular distance from the beam 1 ($B_{MAX}$ in the example) should be investigated.

Therefore, a further condition is sought for introducing a higher level of space diversity. In a preferred embodiment, a condition 11008 verifies if the quality function of the beam $A_{MAX-1}$ is smaller than the quality function of the beam $A_{MAX}$ minus a certain amount, denoted as Threshold 1, and if true the beam 2 is set equal to $A_{MAX}$ at step 11020, because the quality function of the beam $A_{MAX-1}$ is not sufficiently high. Specifically, condition 11008 might verify if $\Delta_{A1}$ is greater than Threshold 1.

On the contrary, if the quality function of the beam $A_{MAX-1}$ has a difference from the quality function of the beam $A_{MAX}$, which is smaller than the quantity Threshold 1 verified by condition 11008 and the beam $A_{MAX-1}$ is not adjacent to $B_{MAX}$ (i.e. negative outcome of a condition 11010) then the beam 2 is set equal to $A_{MAX-1}$ at step 11022 in order to increase the level of space diversity.

If the outcome of the condition 11010 is positive (i.e. $A_{MAX-1}$ is adjacent to $B_{MAX}$), the beam $A_{MAX-2}$ is considered as a possible candidate for the beam 2. Specifically, if the quality function of the beam $A_{MAX-2}$ has a difference from the quality function of the beam $A_{MAX}$ smaller then the quantity Threshold 2 then the beam 2 is set equal to $A_{MAX-2}$ at step 11024. Specifically, condition 11012 might verify if $\Delta_{A2}$ is greater than Threshold 2.

In the absence of candidates with a good value of the quality function $Q_S$ and a higher angular distance from the beam 1, the beam 2 is set equal to $A_{MAX}$ at step 11014.

The left hand side of the flowchart shown in FIG. 13 mirrors the operations of the right hand side, except that all operations are performed on the beams B instead of the beams A. Specifically, equivalent conditions are 11006 and 11106 (i.e. $B_{MAX}$ adjacent to $A_{MAX}$), 11008 and 11108 (i.e. $\Delta_{B1}$ greater than a Threshold 1), 11010 and 11110 (i.e. $B_{MAX-1}$ adjacent to $A_{MAX}$), and 11012 and 11112 (i.e. $\Delta_{B2}$ greater than a Threshold 2). Equivalent steps are 11018 and 11118 (i.e. selection of $B_{MAX}$ as beam 2), 11020 and 11120 (i.e. selection of $B_{MAX}$ as beam 2), 11022 and 11122 (i.e. selection of $B_{MAX-1}$ as beam 2), 11024 and 11124 (i.e. selection of $B_{MAX-2}$ as beam 2), and 11014 and 11114 (i.e. selection of $B_{MAX}$ as beam 2).

In order to better clarify the behavior of the proposed method, the previous numerical example will be considered and the thresholds will be set to Threshold 1=Threshold 2=6.

During the first phase, since $Q_S(A_{MAX})=Q_S(B_{MAX})$ (i.e. conditions 10004 and 10006 are false), the quantities $\Delta_{A1}$ and $\Delta_{B1}$ are computed. Moreover, the outcome of condition 10008 is true, because $\Delta_{B1}=3>\Delta_{A1}=2$, and consequently the beam 1 is set to $B_{MAX}$ at step 10018.

During the second phase, at condition 11004 the right hand side of the flowchart of FIG. 13 is selected, because the first beam is $B_{MAX}$. Since $A_{MAX}$ is adjacent to $B_{MAX}$ (i.e. condition 11006 is true), $A_{MAX}$ is not immediately selected as beam 2. Moreover, also the outcome of condition 11008 is false, because $\Delta_{A1}<$Threshold 1. Accordingly condition 11010 is verified, which has a positive outcome, because $A_{MAX-1}$ is adjacent to $B_{MAX}$. Finally, the quantity $\Delta_{A2}=5$ is considered at condition 11012, observing that $\Delta_{A2}<$Threshold 2, and consequently $A_{MAX-2}$ is selected as beam 2 at stage 11024.

In this way, the two optimal beams would be $B_{MAX}=B_2$ and $A_{MAX-2}=A_4$, obtaining good levels of quality function for both beams, because $Q_S(B_2)=18$ and $Q_S(A_4)=13$ and, at the same time, a good amount of angular diversity.

When the optimal beams $A_{opt}$ and $B_{opt}$, generating the associated optimal signals $r_{iopt}$ and $r_{jopt}$, have been selected the weight $w_k=\exp(j\phi_k)$ is selected.

In an embodiment, this procedure is performed by selecting the optimal beams $A_{opt}$ and $B_{opt}$, feeding the RF combining unit with the corresponding two optimal signals $r_{iopt}$ and $r_{jopt}$, and computing 4 values of the quality function $Q_S(r_{iopt}, r_{jopt}, w_k)$ in correspondence of the 4 different values of the weight $w_k=\exp(j\phi_k)$ for $\phi_k=\{0°,90°,180°,270°\}$ so to obtain:

$$Q_{S1}=Q_S(r_{iopt},r_{jopt},w_1)=\exp(j\cdot 0°)$$

$$Q_{S2}=Q_S(r_{iopt},r_{jopt},w_2)=\exp(j\cdot 90°)$$

$$Q_{S3}=Q_S(r_{iopt},r_{jopt},w_3)=\exp(j\cdot 180°)$$

$$Q_{S4}=Q_S(r_{iopt},r_{jopt},w_4)=\exp(j\cdot 270°)$$

Finally, the largest of the 4 quality functions is selected and the corresponding value of the weight $w_k$ is set equal to $w_{opt}$ so that $$Q_{S,max}=Q_S(r_{iopt},r_{jopt},w_{opt})=\max\{Q_{S1},Q_{S2},Q_{S3},Q_{S4}\}$$

Therefore, the configuration of beams $A_{opt}$ and $B_{opt}$ (generating the associated optimal signals $r_{iopt}$ and $r_{jopt}$) and weight $w_{opt}$ have been selected, which provide a high value $Q_{Smax}$ of the quality function $Q_S(r_i,r_j,w_k)$ with a reduced number of measures of the quality function. Specifically, the number of measures would be equal to 26 for the procedure of Case 1 and to 12 for the procedures of Case 2 and Case 3. By way of contrast an exhaustive search procedure would require 64 measures of the quality function.

In an embodiment, this procedure is executed the first time after the WLAN STA is switched on and then it is periodically repeated in order to track possible variations of the propagation scenario. Therefore all the aforementioned measures of the quality function $Q_S$ have to be periodically repeated.

In certain embodiments, the dependence of the subsequent measures of the quality function $Q_S$ from the particular time instant at which they are taken is take into consideration.

FIG. 14 shows in that respect the definition of a typical measurement cycles. For characterizing every particular basic measurement interval a digital counter k might be used that is increased by 1 after every basic measurement interval having a length of $T_m$ seconds.

The BB and MAC modules of the WLAN STA, every $T_m$ seconds, perform 2 different measures: the first measure is the quality function $Q_S(r_{iopt},r_{jopt},w_{opt},k)$ obtained in correspondence of the selected configuration of beams and weight that is currently the optimal one and in the following denoted as $Q_S(opt,k)$, while the second measure is the quality function $Q_S(A_i,k)$ obtained in correspondence of the configuration of beams and weight that generates an equivalent radiation pattern similar to that of the beam $A_i$ or, alternatively, the quality function $Q_S(B_i,k)$, obtained in correspondence of the configuration of beams and weight that generates an equivalent radiation pattern similar to that of the beam $B_i$.

Moreover, during the basic measurement interval with length $T_m$ seconds, the first $T_m-T_\Delta$ seconds are used for measuring the quality function $Q_S(opt,k)$ while the last $T_\Delta$ seconds are used for measuring the quality function $Q_S(A_i,k)$ or, alternatively, the quality function $Q_S(B_i,k)$. Such measure of the quality functions might e.g. be performed on the basis of the incoming packets transmitted by the AP.

In an embodiment, the WLAN STA performs during the idle mode state the measures of the quality function on the basis of the packets received from the beacon channel while during the active mode state the WLAN STA performs the measures of the quality function on the basis of the data packets transmitted by the AP to that particular WLAN STA.

Therefore, the measure of the quality function $Q_S(opt,k)$, performed in correspondence of the selected configuration of beams and weight that is currently the optimal one, does not introduce any impact on the reception of the user data while the measures of the quality functions $Q_S(A_i,k)$ or $Q_S(B_i,k)$, performed in correspondence of the configurations of beams and weight that generate equivalent radiation patterns similar to those of the beam $A_i$ or $B_i$, can introduce a certain impact on the reception of the user data.

In any case, the periodic measure of the quality functions $Q_S(A_i,k)$ and $Q_S(B_i,k)$ for i=1,2,3,4 is a basis for the periodic selection of the optimal beams and weight, according to the method described with respect to FIGS. 12 and 13, for tracking possible variations of the propagation scenario.

In order to reduce as much as possible the impact on the reception of the user data introduced by the periodic measures of the quality functions $Q_S(A_i,k)$ and $Q_S(B_i,k)$ the following four strategies might be considered:

Strategy 1: When a WLAN STA is in active mode state, within the k-th basic measurement interval, the period of time $T_m-T_\Delta$ used for the measurement of the quality function $Q_S(opt,k)$ and the simultaneous reception of the user data is much larger than the period of time $T_\Delta$ used for the measurement of the quality functions $Q_S(A_i,k)$ or $Q_S(B_i,k)$. In this way only a small number of received packets (in the best case only 1 packet) are employed for the measurement of the quality functions $Q_S(A_i,k)$ or $Q_S(B_i,k)$ limiting as much as possible the impact on the reception of the user data.

Strategy 2: When a WLAN STA is in idle mode state, within the k-th basic measurement interval, the period of time $T_m-T_\Delta$ used for the measurement of the quality function $Q_S(opt,k)$ can be made comparable to the period of time $T_\Delta$ used for the measurement of the quality functions $Q_S(A_i,k)$ or $Q_S(B_i,k)$. For this reason in idle mode state the length of the period $T_m$ is smaller than the corresponding value employed during the active mode state. In fact, during the idle mode state, the WLAN STA does not need to continuously receive user data from the AP and therefore it can use approximately the same time period for measuring the quality functions $Q_S(opt,k)$ and $Q_S(A_i,k)$ or $Q_S(B_i,k)$. Moreover, being the time period $T_m$ smaller compared to the value employed during the active mode state, the estimation of the 8 values $Q_S(A_i,k)$ and $Q_S(B_i,k)$ for i=1,2,3,4 can be faster or more reliable.

Strategy 3: When a WLAN STA is in active mode state, in order to further reduce the impact on the reception of the user data introduced by the measurement of the 8 quality functions $Q_S(A_i,k)$ or $Q_S(B_i,k)$ for i=1,2,3,4, it is possible to proceed in the following way. For example, when a particular configuration of beams and weight generating an equivalent radiation pattern similar to that of the beam $A_1$ is employed, the received signal might present contributions generated also by the signals with a Direction of Arrival (DOA) corresponding to the adjacent beams $B_1$ and $B_4$ even if they are slightly attenuated with respect to the signal received from the DOA of the beam $A_1$. This effect is mainly due to the equivalent radiation pattern of the beam $A_1$ that, being not ideal, collects a certain amount of energy from the DOA of the neighboring beams $B_1$ and $B_4$. It is therefore possible to exploit this effect for performing measurements of the quality functions $Q_S(A_i,k)$ or $Q_S(B_i,k)$ for the beams that are adjacent to the optimal beams $A_{opt}$ and $B_{opt}$ without affecting the reception of the user data.

In order to better clarify this concept, the previous example might be used to explain the method for the selection of the optimal configuration of beams and weight. According to the aforementioned example, after the determination of the two optimal beams $A_{opt}$ and $B_{opt}$ and the optimal weight factor $w_{opt}$ maximizing the quality function $Q_{S,max}$, $A_{opt}=A_4$ and $B_{opt}=B_2$ have been obtained. Based on the previous observation it is therefore possible to measure, during subsequent basic measurement intervals, the quality functions of the beams $A_2$ and $A_3$ that are adjacent to $B_2$ without any impact on the reception of the user data. This measurements will be denoted as $Q_S(A_2,k)$, $Q_S(A_3,k+1)$ in the following. In a similar way, during subsequent basic measurement intervals, the quality functions of the beams $B_3$ and $B_4$ that are adjacent to $A_4$ can be measured with minimum impact on the reception of the user data. This measurements will be denoted as $Q_S(B_3,k+2)$, $Q_S(B_4,k+3)$ in the following. Moreover it is evident that the quality functions corresponding to the beams that are currently selected as optimal $A_{opt}=A_4$ and $B_{opt}=B_2$ can be implicitly measured without any impact on the reception of the user data. These further measurements will be denoted as $Q_S(A_4,k+4)$, $Q_S(B_2,k+5)$ in the following.

Therefore, in the particular considered example, only the measurements of the quality functions $Q_S(A_1,k+6)$ and $Q_S(B_1,k+7)$, corresponding to the beams $A_1$ and $B_1$ that are not adjacent to the optimal beams $A_4$ and $B_2$, require the selection of particular combinations of beams and weights that, in principle, can introduce a certain impact on the reception of the user data.

Strategy 4: When a WLAN STA is in active mode state, exploiting the fact that the measures of the quality functions of the beams that are adjacent to $A_{opt}$ and $B_{opt}$, together with the measures of the quality functions relative to the optimal beams $A_{opt}$ and $B_{opt}$ itself, do not introduce an impact on the reception of the user data, it is possible to organize the measures of the quality functions $Q_S(A_i,k)$ or $Q_S(B_i,k)$ for i=1,2, 3,4 in a suitable way for maximizing the time distance between subsequent quality function measurements that can potentially introduce an impact on the reception of the user data.

By using the data of the aforementioned example it is possible to organize the measurements of the quality functions $Q_S(A_i,k)$ or $Q_S(B_i,k)$ for i=1,2,3,4 during subsequent basic measurements periods in the following way $$Q_S(A_1,k),\ Q_S(A_2,k+1),\ Q_S(B_2,k+2),\ Q_S(A_3,k+3),$$

$$Q_S(B_1,k+4),\ Q_S(B_3,k+5),\ Q_S(A_4,k+6),\ Q_S(B_4,k+7)$$

In this way the time distance between the measurements of the quality functions $Q_S(A_1,k)$ and $Q_S(B_1,k+4)$ that may introduce an impact on the reception of the user data is maximized.

By way of reference, table 5 summarizes the meaning of the variables used in the procedures described in the foregoing.

TABLE 5

Definition of the variables used

| Variable | Meaning |
|---|---|
| $Q_S(opt,k)$ | Value of the quality function $Q_S(opt,k) = Q_S(r_{iopt},r_{jopt},w_{opt},k)$ measured by the receiver when the value of the digital counter is equal to k in correspondence of the selected configuration of beams and weight that currently is the optimal one. The measure of the quality function is performed on the incoming packets received during a time interval equal to $T_m - T_\Delta$. |

TABLE 5-continued

Definition of the variables used

| Variable | Meaning |
|---|---|
| $Q_S(opt,l)$ | Value of the quality function $Q_S(opt,l)$ calculated at time l as an average over 8 subsequent basic measurement intervals of the value $Q_S(opt,k)$ measured by the receiver when the value of the digital counter is equal to k in correspondence of the selected configuration of beams and weight that currently is the optimal one. |
| $Q_S(A_i,k)$ | Value of the quality function measured by the receiver, when the value of the digital counter is equal to k, in correspondence of the configuration of beams and weight that generates an equivalent radiation pattern similar to that of the beam $A_i$. The measure of the quality function is performed on the incoming packets received during a time interval equal to $T_\Delta$. |
| $Q_S(B_i,k)$ | Value of the quality function measured by the receiver, when the value of the digital counter is equal to k, in correspondence of the configuration of beams and weight that generates an equivalent radiation pattern similar to that of the beam $B_i$. The measure of the quality function is performed on the incoming packets received during a time interval equal to $T_\Delta$. |
| $Q_{S,max}$ | Value of the quality function for the selected configuration of beams and weight that currently is the optimal one. This value is computed during the selection of the optimal configuration of beams and weight on the basis of the quality functions $Q_S(A_iQ)$ and $Q_S(B_i)$ for i = 1, 2, 3, 4. |
| $Q_S(l)$ | Maximum value of the quality functions $Q_S(A_i,k)$ or $Q_S(B_i,k)$ calculated at the end of 8 subsequent basic measurement intervals. |
| $Q_{S\ update}$ | Threshold of the quality function that activates the updating procedure in order to check if the current beam and weight configuration is still the optimal one. When the value of the quality function $Q_S(opt,k)$, measured by the receiver, becomes smaller than the value $Q_{S,max}$, determined during the previous selection of the optimal configuration of beams and weight, by a factor $Q_{S\ update}$ a further procedure for determining the new configuration of optimal beams and weighting factor together with the corresponding measure of the new value $Q_{S,max}$ is performed. The same procedure is performed when one of the unused beam of the SB antenna system has a quality function $Q_S(A_i,k)$ or $Q_S(B_i,k)$ greater than $Q_{S,max}$ by a factor $Q_{S\ update}$. |
| k | Digital counter that is up-dated every $T_m$ seconds. When k becomes equal to $K_{update}$ the counter k is reset to the value equal to 1 and a further procedure for determining the new configuration of optimal beams and weighting factor is performed on the basis of the quality functions $Q_S(A_i)$ and $Q_S(B_i)$ for i = 1, 2, 3, 4. |
| l | Digital counter that is up-dated every $8 \cdot T_m$ seconds. When l becomes equal to $N_{ACC}$ the counter l is reset to the value equal to 1 and a further procedure for determining the new configuration of optimal beams and weighting factor is performed on the basis of the quality functions $Q_S(A_i)$ and $Q_S(B_i)$ for i = 1, 2, 3, 4. |
| $T_m$ | A new measure of the quality functions $Q_S(opt,k)$ and $Q_S(A_i,k)$ or $Q_S(B_i,k)$ is performed by the BB and MAC modules of the WLANSTA every $T_m$ seconds. The measure of the quality function $Q_S(opt,k)$ is performed on the incoming packets received during a time interval equal to $T_m - T_\Delta$. The measure of the quality function $Q_S(A_i,k)$ or $Q_S(B_i,k)$ is performed on the incoming packets received during a time interval equal to $T_\Delta$. |
| $T_m - T_\Delta$ | Time interval during which the measure of the quality function $Q_S(opt,k)$ is performed. |
| $T_\Delta$ | Time interval during which the measure of the quality function $Q_S(A_i,k)$ or $Q_S(B_i,k)$ is performed. |
| $K_{update}$ | Value of the counter k after which a further procedure for determining the optimal beams and weighting factor together with the corresponding measure of the new value $Q_{S,max}$ is performed on the basis of the quality functions $Q_S(A_i)$ and $Q_S(B_i)$ for i = 1, 2, 3, 4. |
| $r_i,r_j$ | Signals at the output of the RF switching network shown in FIG. 10a. |
| $r_{iopt}$ | Optimal signal, received from the beam $A_i$ of the subset A, in correspondence of the selected configuration of beams and weight that is currently the optimal one. |

TABLE 5-continued

| Definition of the variables used | |
|---|---|
| Variable | Meaning |
| $r_{jopt}$ | Optimal signal, received from the beam $B_j$ of the subset B, in correspondence of the selected configuration of beams and weight that is currently the optimal one. |
| $w_{opt}$ | Optimal weighting coefficients, employed for co-phasing the signal $r_{jopt}$, in correspondence of the selected configuration of beams and weight that is currently the optimal one. |

FIG. 15 exemplifies a flowchart of the periodical procedure for tracking the possible time variations of the propagation environment.

After a start step 12002, in a step 12004 the counter is k is set to 1. In the following step 12006, the quality functions $Q_S(A_i,k)$ and $Q_S(B_i,k)$ for i=1,2,3,4 are measured and in step 12008 the optimal configuration of beams and weights, together with the related quality function $Q_{S,max}$ are selected.

At step 12010 the k-th basic measurement of the quality functions $Q_S(opt,k)=Q_S(r_{iopt},r_{jopt},w_{opt},k)$ and one of the cost functions $Q_S(A_i,k)$ or $Q_S(B_i,k)$ are performed. In this way the quality function $Q_S(opt,k)$ of the current optimal configuration of beams and weight is periodically updated as well as the data base keeping the 8 quality functions $Q_S(A_i,k)$ or $Q_S(B_i,k)$ for i=1,2,3,4 used as input for the method, described with respect to FIGS. 12 and 13, selecting the optimal configuration of beams and weight together with the related quality function $Q_{S,max}$.

A new procedure for the selection of a new configuration of beams and weight is started when the value of the quality function $Q_S(opt,k)$, measured by the receiver during the k-th basic measurement interval, becomes smaller than the value $Q_{S,max}$, determined during the previous selection of the optimal configuration of beams and weight, by a factor $Q_{S\ update}$ (in this case a new selection is started since the optimal configuration would have a poor quality). This verification is implemented by a condition 12012 which controls if $Q_S(opt, k)$ is smaller than $(Q_{S,max}-Q_{S\ update})$.

Moreover, a new procedure for the selection of a new configuration is started when the value of the quality function $Q_S(A_i,k)$ or $Q_S(B_i,k)$, measured by the receiver during the k-th basic measurement interval, becomes greater than the value $Q_{S,max}$, determined during the previous selection of the optimal configuration of beams and weight, by a factor $Q_{S\ update}$ (in this case a new selection is started since an unused beam of the SB antenna system would have an high quality). This verification is implemented by a condition 12014, which controls if either $Q_S(A_i,k)$ or $Q_S(B_i,k)$ is greater than $(Q_{S,max}+Q_{S\ update})$.

Specifically, in both cases (i.e. conditions 12012 and 12014), a new procedure for the selection of a new configuration is started by going back to step 12008.

On the contrary (i.e. negative result of both conditions 12012 and 12014), a new procedure for the selection of a new configuration of beams and weight is started when the counter k of the basic measurement intervals reaches the limit value $K_{update}$, which is verified by a condition 12016. Specifically, a new procedure is started by resetting the counter k to 1 in step 12018 and going back to step 12008.

On the contrary, a new measurement cycle is started by incrementing the counter k by 1 in a step 12020 and going back to step 12010.

In an embodiment, $K_{update}$ is equal to an integer number multiple of 8, i.e. $K_{update}=N_{ACC}\cdot 8$, where $N_{ACC}$ is parameter quantifying the number of measures $Q_S(A_i,k_0)$, $Q_S(A_i,k_0+8)$, $Q_S(A_i,k_0+16)$, . . . $Q_S(A_i,k_0+8\cdot(N_{ACC}-1))$ relative to the same beam $A_i$ that eventually can be averaged in order to improve the corresponding reliability. In this way the procedure for selecting the optimal configuration of beams and weight receives as input 8 values $\overline{Q}_S(A_i)$ or $\overline{Q}_S(B_i)$ for i=1,2,3,4 that have been averaged over a number $N_{ACC}$ of basic measurement intervals.

An alternative periodical procedure for tracking the possible time variations of the propagation environment is described in the flow chart of FIG. 16.

After a start step 13002, the quality functions $Q_S(A_i,k)$ and $Q_S(B_i,k)$ for i=1,2,3,4 are measured in step 13004 and the optimal configuration of beams and weight together with the related quality function $Q_{S,max}$ are selected in step 13006.

At step 13008 a new measurement procedure is started (i.e. the counter k is set to 1) and at step 13010 the k-th basic measurement of the quality functions $Q_S(opt,k)=Q_S(r_{iopt}, r_{jopt},w_{opt},k)$ and one of the cost functions $Q_S(A_i,k)$ or $Q_S(B_i,k)$ are performed. In this embodiment, the measurements are performed for 8 subsequent basic measurement intervals in order to have at the end four $Q_S(A_i,k)$ and four $Q_S(B_i,k)$ updated values.

Such a loop might be implemented by a condition 13012, which verifies if k is equal to 8, and incrementing k by 1 and reactivating step 13010, if the result of the verification was false.

The results are used as input for the method, described with respect to FIGS. 12 and 13, selecting the optimal configuration of beams and weight together with the related quality function $Q_{S,max}$.

In the next step 13014, the quality function $Q_S(opt,I)$ is calculated as an average of the eight $Q_S(opt,k)$ previously measured and $Q_S(I)$ is calculated as the maximum of the quality function of the eight beams of the SB antenna system.

A new procedure for the selection of a new configuration of beams and weight is started when the value of the quality function $Q_S(opt,I)$ becomes smaller than the value $Q_{S,max}$, determined during the previous selection of the optimal configuration of beams and weight, by a factor $Q_{S\ update}$ (in this case a new selection is started since the quality function averaged over 8 basic measurement intervals in correspondence of the optimal configuration of beams and weight has a poor quality). This verification is implemented by a condition 13016 which controls if $Q_S(opt,I)$ is smaller than $(Q_{S,max}-Q_{S\ update})$.

Moreover, a new procedure for the selection of a new configuration is started when the value of the quality function $Q_S(I)$ becomes greater than the value $Q_{S,max}$, determined during the previous selection of the optimal configuration of beams and weight, by a factor $Q_{S\ update}$ (in this case a new selection is started since an unused beam of the SB antenna system has an high quality). This verification is implemented by a condition 13018, which controls if $Q_S(I)$ is greater than $(Q_{S,max}+Q_{S\ update})$.

In this embodiment, a new procedure for the selection of a new configuration is started by going back to step 13006.

Alternatively a new procedure for the selection of a new configuration of beams and weight is started when the counter I of the eight basic measurement intervals reaches the limit value $N_{ACC}$, which is verified by condition 13020, wherein $N_{ACC}$ is the parameter quantifying the number of measures $Q_S(A_i,I_0)$, $Q_S(A_i,I_0+1)$, $Q_S(A_i,I_0+2)$, . . . $Q_S(A_i,I_0+(N_{ACC}-1))$ relative to the same beam $A_i$ that eventually can be averaged in order to improve the corresponding reliability. In this way the procedure for selecting the optimal configuration of beams and weight receives as input 8 values $\overline{Q}_S(A_i)$ or $\overline{Q}_S(B_i)$ for i=1,2,3,4 that have been averaged over a number $N_{ACC}$ of basic measurement intervals. Specifically, previous to going back to step 13006 the counter I is set to 1 at step 13024.

On the contrary, if the outcome of the verification of condition 13020 is false, a new measurement cycle is started by incrementing the counter I by 1 in step 13026 and going back to step 13008.

The application of the switched beam antenna with WRF combining as described herein is not limited to WLAN systems but can be also envisaged for cellular systems as, for example, third generation (3G) mobile communication systems. Examples of possible application are the evolution of the UMTS and CDMA2000 radio interfaces denoted respectively as HSDPA (High Speed Downlink Packet Access) and 1xEV-DO (EVolution, Data-Optimized). These two transmission technologies are optimized for the provision of high speed packet data services in downlink, including mobile office applications, interactive games, download of audio and video contents, etc. The switched beam antenna architecture according to the invention can be easily integrated in an HSDPA or 1xEv-DO modem in order to provide benefits in terms of average and peak throughput with respect to a conventional modem equipped with one omnidirectional antenna.

The benefits of the switched beam antenna as described herein are plural. A first benefit is the reduction of the inter-cell interference obtained through the spatial filtering of the signals transmitted by the interfering cells. By using a directional antenna system it is possible to maximize the signal received from the serving cell and at the same time minimize the interfering signals arriving from the other directions. A reduction of the inter-cell interference corresponds to an increment of the geometry factor G, defined as the ratio between the power of the signal received from the serving cell and the power of the signals received from the interfering cells. The users near to the cell edge typically face a low value of the geometry factor and thus the switched beam antenna can provide significant benefits in terms of throughput.

A second benefit of the switched beam antenna is obtained for users near to the serving base station. For these users the inter-cell interference is minimal but the link performance is degraded by the intra-cell interference caused by the other channels (common and dedicated) transmitted by the serving base station. This self interference is a consequence of the multipath propagation that reduces the orthogonality among the different spreading codes. The utilization of the switched beam antenna reduces the delay spread and consequently increases the orthogonality of the propagation channel. The effect of the switched beam antenna is equivalent to an equalization of the channel frequency response in the spatial domain that reduces the intra-cell interference and thus brings an increment of the data throughput.

It will be appreciated that the procedures just described involve, after a “current” sub-set of received RF signals has been selected for combining into a single RF signal for demodulation, an at least partial repetition of the procedure for selecting the sub-set of RF signals to be used for reception. This at least partial repetition of the selection procedure aims at searching a candidate sub-set of received RF signals to be possibly selected as an alternative to the current sub-set.

The radio performance indicator (RPI) representative of the quality of the RF signals in the current sub-set is monitored and a check is performed at given times in order to verify whether a candidate sub-set of received RF signals exists which is able to provide a radio performance indicator improved (e.g. higher) over the radio performance indicator representative of the quality of the RF signals in the current sub-set. If such a candidate sub-set is located, the candidate sub-set is substituted for the current subset. When the selection step is (at least partly) repeated, the RF signals received from the candidate sub-set being tested are combined into a single RF signal for demodulation and may be used for reception.

In that way, measurements on alternative beams can be performed simultaneously or almost simultaneously with the reception of user data, by using a single RF chain. The received signal quality on some of the alternative beams can be measured without completely interrupting the reception of the user data from the selected beam, with a small number of periodical measures of the signal quality on alternative beams. This avoids giving rise to an appreciable interruption or packet loss, with a reduced impact on the quality of the received service.

Without prejudice to the underlying principles of the invention, the details and the embodiments may vary, even appreciably, with reference to what has been described by way of example only, without departing from the scope of the invention as defined by the annexed claims.

The invention claimed is:

1. A method of processing an RF signal received via a plurality of antenna elements, comprising:

selecting a sub-set of received RF signals from said antenna elements, said sub-set comprising a given number of RF signals; and combining the received RF signals of said selected sub-set into a single RF signal for demodulation;

wherein selecting said sub-set of received RF signals comprises:

passing selective ones of said RF signals received from groupings of all said antenna elements through respective two-layer switching networks;

producing selective sets of said received RF signals by applying relative RF phase shift weights to the RF signals from said two-layer switching networks, wherein each set comprises RF signals received from a number of adjacent antenna elements equal to said given number;

generating for each said selective set of RF signals, at least one radio performance indicator representative of the quality of the RF signals in the set; and identifying the sub-set to be selected as a function of said at least one radio performance indicator generated for selective sets of said received RF signals.

2. The method of claim 1, wherein selecting said sub-set of received RF signals comprises producing selective sets of said received RF signals wherein the contribution of one signal in the set is higher than the contribution of any other signal in the set.

3. The method of claim 1, wherein selecting said sub-set of received RF signals comprises:

selecting as a first element of said sub-set an RF signal giving a best value for said at least one radio performance indicator; and selecting as a subsequent element of said sub-set at least one RF signal selected as a function of said at least one radio performance indicator and the respective angular diversity to said first element of said sub-set of received RF signals.

4. The method of claim 1, wherein, after a current sub-set of received RF signals has been selected for combining into a single RF signal for demodulation, selecting said sub-set of received RF signals is at least partly repeated in search of a sub-set of received RF signals which are a candidate for selection.

5. The method of claim 4, further comprising:

monitoring said at least one radio performance indicator representative of the quality of the RF signals in said current sub-set;

checking whether at least partly repeating selecting said sub-set of received RF signals leads to locating a candidate sub-set of received RF signals providing a radio performance indicator improved over the radio performance indicator representative of a quality of the RF signals in said current sub-set; and if such a candidate sub-set is located, substituting said candidate sub-set for said current sub-set.

6. The method of claim 4, wherein said at least partly repeating selecting said sub-set of received RF signals comprises at least temporarily combining the received RF signals from a candidate sub-set into a single RF signal for demodulation.

7. The method of claim 1, wherein said at least one radio performance indicator is a non-RF radio performance indicator.

8. The method of claim 1, wherein said at least one radio performance indicator is selected from: received signal strength indicator, packet error rate, signal to interference-plus-noise ratio, MAC throughput and employed transmission mode, and combinations thereof.

9. A system for processing an RF signal received via a plurality of antenna elements, comprising:

a connection arrangement for selecting a sub-set of received RF signals from said antenna elements, said sub-set comprising a given number of RF signals;

a processing arrangement for combining the received RF signals of said selected sub-set into a single RF signal for demodulation;

a plurality of two-layer switching networks each configured to pass selective ones of said RF signals received from groupings of all said antenna elements;

an RF phasing circuit for producing selective sets of said received RF signals by applying relative RF phase shift weights to the RF signals from said two-layer switching networks, wherein each set comprises RF signals received from a number of adjacent antenna elements equal to said given number;

a radio performance estimator for generating for each selective set of RF signals, at least one radio performance indicator representative of a quality of the RF signals in the set; and a decision block for identifying the sub-set of received RF signals to be selected by said connection arrangement as a function of said at least one radio performance indicator generated for said selective sets of said received RF signals.

10. The system of claim 9, wherein the system is capable of being configured for identifying said sub-set of received RF signals to be selected by said connection arrangement by producing selective sets of said received RF signals, wherein the contribution of one signal in the set is higher than the contribution of any other signal in the set.

11. The system of claim 9, comprising a configuration capable of identifying said sub-set of received RF signals to be selected by said connection arrangement by:

selecting as a first element of said sub-set, an RF signal giving a best value for said at least one radio performance indicator; and selecting as a subsequent element of said sub-set, at least one RF signal selected as a function of said at least one radio performance indicator and a respective angular diversity to said first element of said sub-set of received RF signals.

12. The system of claim 9, comprising a configuration capable of at least partly repeating said selection of said sub-set of received RF signals after a current sub-set of received RF signals has been selected for combining into a single RF signal for demodulation, said at least partly repeating said selection being in search of a sub-set of received RF signals candidate for selection.

13. The system of claim 12, comprising a configuration capable of:

monitoring said at least one radio performance indicator representative of the quality of the RF signals in said current sub-set;

checking whether at least partly repeating said selection of said sub-set of received RF signals leads to locating a candidate sub-set of received RF signals providing a radio performance indicator improved over the radio performance indicator representative of the quality of the RF signals in said current sub-set; and if such a candidate sub-set is located, substituting said candidate sub-set for said current sub-set.

14. The system of claim 12, comprising a configuration capable of at least temporarily combining the received RF signals from a candidate sub-set into a single RF signal for demodulation during said at least partly repeating said selection of said sub-set of received RF signals.

15. The system of claim 9, wherein said at least one radio performance indicator is a non-RF radio performance indicator.

16. The system of claim 9, wherein said at least one radio performance indicator is selected from: received signal strength indicator, packet error rate, signal to interference-plus-noise ratio, MAC throughput and employed transmission mode, and combinations thereof.

* * * * *